United States Patent [19]

Dekelbaum et al.

[11] Patent Number: 5,838,682
[45] Date of Patent: Nov. 17, 1998

[54] METHOD AND APPARATUS FOR ESTABLISHING COMMUNICATIONS WITH A REMOTE NODE ON A SWITCHED NETWORK BASED ON HYPERTEXT DIALING INFORMATION RECEIVED FROM A PACKET NETWORK

[75] Inventors: George J. Dekelbaum, Basking Ridge; Philip J. Fischer, Bedminster, both of N.J.; Charles N. Judice, Rochester, N.Y.; Richard G. Backus, Manassas, Va.; Stephen J. Flaherty, Upper Marlboro, Md.

[73] Assignee: Bell Atlantic Network Services, Inc., Arlington, Va.

[21] Appl. No.: 563,243

[22] Filed: Nov. 28, 1995

[51] Int. Cl.[6] .................................................. H04L 12/66
[52] U.S. Cl. ........................................................... 370/401
[58] Field of Search ..................................... 370/351, 352, 370/355, 356, 401, 408, 522, 524, 389, 392, 264; 379/354, 355

[56] References Cited

U.S. PATENT DOCUMENTS 5,204,894  4/1993  Darden ..................................... 379/355
5,559,862  9/1996  Bhagat et al. ........................... 379/355

OTHER PUBLICATIONS

David H. Crocker, Standard For The Format of ARPA Internet Text Messages, Aug. 13, 1982, Entire Document, University of Delaware, Newark, DE.

Jerry Martin, There's Gold in them thar Networks! or Searching for Treasure in all the Wrong Places, Jan. 1993, Entire Document, Ohio State University, Columbus, Oh.

E. Krol and E. Hoffman, FYI on "What is the Internet?", May 1993, Entire Document, University of Illinois at Urbana, IL and Merit Network, Inc. at Ann Arbor, MI.

N. Borenstein and N. Freed, MIME (Multipurpose Internet Mail Extensions) Part One: Mechanisms for Specifying and Describing the Format of Internet Message Bodies, Sep. 1993, Entire Document, Bellcore and Innosoft.

A. Marine and J. Reynolds and G. Malkin, FYI on Questions and Answers Answers to Commonly asked "New Internet User" Questions, March 1994, Entire Document, NASA NAIC and ISI and Zylogics.

Christian Huitema and Phill Gross, The Internet Standards Process—Revision 2, Mar. 1994, Entire Document, Internet Architecture Board and Internet Engineering Steering Group.

Jon Postel, Internet Official Protocol Standards, November 1994, Entire Document, Internet Architecture Board.

T. Berners–Lee and L. Masinter and M. McCahill, Uniform Resource Locators (URL), Dec. 1994, Entire Document, CERN and Xerox Corp. and University of Minnesota.

Charles L. Hedrick, Introduction to the Internet Protocols, Jul. 3, 1987, Entire Document, Rutgers–The State of New Jersey.

Mary Overby, WWW Terminology and Definitions, Feb. 28, 1995, Entire Document, Internet Draft.

(List continued on next page.)

*Primary Examiner*—Douglas W. Olms
*Assistant Examiner*—Ajit Patel
*Attorney, Agent, or Firm*—Lowe, Price, LeBlanc & Becker

[57] ABSTRACT

An Internet type access system includes an autodialer for automatically establishing communications with a merchant's facility over a switch network while maintaining Internet connectivity over a packet data network. The autodialer, in combination with the merchant's server, coordinates between the Internet session and the newly established switched connectivity, the session history from the prior Internet session being supplied to a sales representative receiving the autodialed call. The sales representative is provided with a terminal for controlling the merchant's server to push data to the client in response to the interactive session simultaneously conducted over the switched network.

46 Claims, 15 Drawing Sheets

OTHER PUBLICATIONS

Jon Crowcraft, An Introducing to HTML, May 10, 1995, Entire Document.

Jon Crowcraft, Beneath the Surf, May 10, 1995, Entire Document.

Matisse Enzer & Internet Literacy Consultants (tm), Glossary of Internet Terms, Sep. 13, 1995, Entire Document.

Tim Berners–Lee, A Beginner's Guide to HTML, Entire Document, CERN.

CWRU and Eric A. Meyer, A Beginner's Guide to URLs, Entire Document.

Netscape Communications Corporation, Creating Net Sites—An Exploration of Dynamic Documents, 1995, Entire Document.

Liu, Jian, Internet Primer for Information Professionals: A Basic Guide to Internet Networking Technology.xbook reviews, Sep. 22, 1993, Entire Document.

WELCOME TO
The Sports Emporium

Simply the best in on-line shopping for all your sporting goods needs.

From Golf to  Sailing

We are simply the BEST

Click here to order in New Jersey  <1-800-555-1212>

Click here for all other orders  <1-800-555-2222>

METHOD AND APPARATUS FOR ESTABLISHING COMMUNICATIONS WITH A REMOTE NODE ON A SWITCHED NETWORK BASED ON HYPERTEXT DIALING INFORMATION RECEIVED FROM A PACKET NETWORK

TECHNICAL FIELD

The present invention relates to data communications terminals and networks, and more particularly, to information systems that initiate communications connectivity on a switched network in response to hyperlink supplied data retrieved from a packet data network.

BACKGROUND ART

Telephone marketing and sales systems have been used by merchants to remotely accept orders from consumers without requiring a trip to a retail establishment. Merchants have traditionally advertised their products for sale to the public using print, radio and television media including a telephone number for consumers to call to obtain further information and place orders for their products. Sales representatives at a centralized merchant sales facility answer the customer calls, answer questions and place orders for products.

Referring to FIG. 12, a merchant telephone sales facility 400 includes sales representative stations 402a through 402c, each having respective computer terminals 404a through 404c for accessing product database and ordering system 408. Each station further has one of telephones 406a through 406c. Incoming telephone calls from customers placed using telephones 412a through 412c are carried by Public Switched Telephone Network (PSTN) 414 to merchant telephone sales facility 300 where the incoming lines are terminated at automatic call distributor (ACD) 410. ACD 410 monitors sales representative stations 402a through 302c for availability and activity, and routes the incoming calls to the appropriate available sales representative's telephone 406a through 406c. The ACD may include other functionality, such as receipt and display on the appropriate telephone of the telephone number of the calling party using calling number identification (CID) data supplied by PSTN 414.

Upon acceptance of an incoming call, a sales representative solicits information from the calling party to determine the nature of the call, e.g., the product the caller is interested in, type of information being solicited, etc. The sales representative may also use the CID information to access any records about that customer that may be stored on product database and ordering system 408 using terminals 404a–404c. ACD 410 may further include a voice response unit (vru) to automatically solicit preliminary information from customers, record the responses, route the call to an appropriate sales representative, and display or playback the recorded responses. For example, a vru may ask calling parties to respond to a series of menu selections to indicate the purpose of the call using the dtmf (dual tone, multi-frequency) keypad capability of the customer's telephone 412a–412c.

A disadvantage of the prior art telephone marketing method is that there is no automatic way for the sales representative to know what materials prompted the customer to place the call or what information has been reviewed by the customer immediately prior to the call. Further, the sales representative must convey all information to the caller orally or mail or fax information, such as graphic literature, to the caller. Because the caller may not obtain sufficient or satisfactory types of information orally and because of the delays and inability to interactively access the customers needs if information is sent via mail or facsimile, the customer's product evaluation and selection process may be compromised and/or sales may be lost.

In addition to conventional print, radio and television advertising, merchants are increasingly making information about, and accepting orders over, electronic data links. Using a home computer, a potential customer may access a merchant's electronic catalog system, obtain product information, and even place orders. While some merchants maintain dedicated computers called "servers" to provide dedicated dialup service over the PSTN, an increasing number of businesses are accessible over the Internet, a seamless network of cooperating subnetworks using Internet Protocol (IP.) (A brief introduction to the Internet is given in Request for Comments [RFC] 1462 and Internet Protocol Standards are given in RFC 1720, both incorporated herein by reference.) In particular, the graphics capabilities and hot links (also referred to as hot spots, hyperlinks and hypertext) supported by hypertext transport protocol (HTTP) of the Worldwide Web (WWW or "Web") sites of the Internet have resulted in many merchants offering their own home pages on the Web advertising their products and services.

As depicted in FIG. 13, a "client" can access the WWW of the Internet using a home computer running "Web Browser" software such as Netscape or Mosaic. In this case, terminal 500 includes a conventional personal computer (PC) 510 running the Web Browser software and having communications interfacing means (not shown) for connecting to and communicating with remote servers or "web sites" on the Internet, conventionally via a client server. The browser software displays textual and graphical information retrieved from the WWW on video display 520. Digital audio information is conventionally played either through speakers internal to PC 510 (not shown) of auxiliary external speakers. Control of and data entry into PC 510 is provided by keyboard 530 and graphical input device, i.e., "mouse" 540. In particular, the user moves a cursor displayed on monitor 520 to designate a desired portion of the display.

The browser software provides a tool for the user to navigate the WWW and other type Internet sites (e.g., FTP [file transfer protocol] and Gopher sites) without having to know the lengthy uniform resource locators (URL) addresses of the sites to be accessed. (The current Internet standard for URLs is given in the Network Working Group RFC 1738, incorporated herein by reference.) Instead of entering the URL, the user employs a graphical input device to "click on" a highlighted portion of text (known as "hypertext") or graphics (together known as "hyperlinks") to retrieve associated information. The browser interprets the hypertext formatted as hypertext markup language (HTML) and transmitted using hypertext transfer protocol (HTTP.) If the hypertext points to an information source outside of the current hypertext page, it initiates a service request to the URL associated with the selected hypertext. Thus, each page of information in HTML format includes not only text and graphics, but the embedded addresses of sites having related information.

Most Internet applications, including HTTP, follow a client server model. One computer system, called the server, runs the hypertext database part of the application. The server is provided by a merchant or other information source maintaining a home page on the Web. Other computers, called clients, request services, usually in the form of information requests, from the server. On a UNIX system the server part of the application normally runs in the background and is called a "daemon." Servers are identified by the type of service involved. Therefore, a system running the HTTP server daemon is called an HTTP server. A given computer system can have multiple servers running simultaneously. Thus, a single server might simultaneously function as an HTTP server, an FTP server, and a LAN (local area network) server as well as several other types of servers.

All Internet communications protocols use a layered architecture. Each layer communicates only with the layer immediately adjacent. At the physical layer this means that information is encapsulated with header and trailer information and then passed to the next layer. Only the bottom "physical" layer actually communicated directly with another system. A better way to visualize this is to think of a set of nesting blocks instead of a series of layers. The top layer becomes the inner most box. The contents of this box constitutes data. The box itself is the protocol wrapper. The box then nests inside another box where it becomes the data and the outer box constitutes the protocol wrapper. The outer most box is analogous to the bottom physical layer. It is the outer most box that is carried from one place to another.

The Department of Defense Transport Control Protocol (TCP)/Internet Protocol (IP) specification is a five layer model. Internet applications such as FTP or HTTP constitute the topmost layer, or innermost box. The next layer down is the FTP layer, the IP layer, then the Link layer, then the physical layer, or outermost box using the box analogy.

HTTP is a connectionless stateless communications protocol. This means that the conventional HTTP server does not retain any knowledge of past transactions, at least not as part of the protocol. In addition, when the transaction is completed the connection between server and client is broken.

A transaction is initiated when the HTTP client requests a service or resource from the server. The client software uses a Unique Resource Identifier (URI) to determine where the resource it wants to access resides on the Internet. A URI is either a Uniform Resource Locator (URL) or Uniform Resource Name (URN.) A URL specifies the actual location of the resource, while a URN identifies the place where the resource is located and must be translated into a URL. In current practice URLs are always used for HTTP applications.

It is a common misconception that URLs are static files that are the same for every client that makes a request. However a URL can point to any type of resource. By way of example, a resource can be the result of a data base query of the result of an action taken by a process initiated by the server. One example is a CGI script. CGI, or Common Gateway Interface, is a specification that defines interactions with the server. A CGI script is an interpreted series of commands that directs the system to do something. It is analogous to a BAT file on a PC or a REXX file on an IBM system.

An HTTP server exists for the purpose of sending objects to a requester using the HTTP protocol. One such object is a Home Page. A Home Page is simply a document that has been composed or "markedup" using the HTML.

A markup language consists of control strings or tags inserted into a document to specify the layout attributes. Examples of common markup languages include Postscript and the various proprietary markup languages used by word processors. HTML is not as encompassing as these examples. For example, while HTML can specify that a given piece of a" document is a header and/or that is should be rendered emphasized, the meaning of emphasized is left to the interpreter. In contrast, Postscript can be used to specify very specific attributes such as 18 point courier bold left justified. The HTML standard used by the Internet is described in "A Beginner's Guide to HTML" available on the Internet. Further information about HTML can also be found at "http://www.gov.nb.ca/hotlist/htmldocs.htm".

A Web Browser such as Mosaic or Netscape is a client application that can interpret HTML and communicate using the HTTP protocol. A browser may or may not know what to do with a resource that is returned to it by the server. A protocol known as MIME (Multipurpose Internet Mail Extension) is used to tell the browser how to handle the associated data and/or what "helper" application to pass the resource to. MIME was originally developed to allow e-mail applications to carry binary data as well as 7 bit ASCII text data but has been expanded to accommodate other types of data. Thus, for proper operation, the server must tell the client what the MIME type is and the client must be setup to deal with that MIME type. This is usually done by having an associative table and associated helper program software on the client computer.

A typical request-response scenario might proceed as follows. A user on a Microsoft Windows equipped operating system (OS) may be executing a Web Browser such as Netscape. The user clicks on a hot spot within the document that contains a URL. The browser recognizes the tag as identifying a URL, encapsulates it within an HTTP wrapper and passes it to the OS TCP stack which includes code to handle the data. The OS then initiates a connection with the server's host system. Once the OS and the host system establish communication, the OS ships the request to the host. This request is passed through the various protocol layers to the HTTP daemon or server. The server interprets the request, checks its MIME type, and sends the client the resource and information about the resource's MIME type. When the OS receives the resource it passes it back to the browser which examines the response. If the returned object is an HTML document, the browser displays the document on the computer display screen. If the object is a MIME type that the browser cannot handle, it checks its associate table and launches the associated helper program software, passing it the resource for processing. In the meantime, once the request has been satisfied, either the server or the client breaks the connection thus freeing up the browser for another request.

The MIME specification is set forth in RFC 1521, incorporated herein by reference. The specification includes various standard MIME types including "text/plain"; "application/binary"; "application/postscript", "image/gif"; "image/xbm"; "image/jpeg"; "audio/basic"; "video/mpeg"; and "video/quicktime."

While the Internet and, particularly, the WWW provide for rapid dissemination of data to potential customers, interactivity is limited to the retrieval of information under client request, i.e., the pull model server. That is, the customer has control over the information retrieved from the available pages of information on the merchant's server. However, there is no means for the merchant to interactively guide the user through the various pages of information stored on the server. If a potential customer cannot locate or identify information on product of interest, the merchant has no means to interactively assist, nor would the merchant even know the customer's dilemma.

An apparent lack of security is another problem that must be addressed by merchants in selling services and products on the Internet. These problems include an inability to verify the authenticity of a purchase or to pay for a purchase particularly since the information may be compromised as it traverses the Internet. Therefore, may merchants rely on conventional telephone calls to take orders and accept credit card and other forms of payment. However, this requires that the potential customer identify the appropriate merchant telephone number, abandon their computer and possibly disconnect from their Internet access provider to place a telephone call to the merchant.

Accordingly, a need exists for an Internet type browser system that automatically initiates connectivity with a merchant over a switched telephone network independent of the data network providing Internet connectivity with the merchant.

A further need exists for an Internet type data retrieval system that accommodates simultaneous and coordinated data transmission over a packet data network and dedicated communications over a switched telephone network between a user and a remote information provider site.

A still further need exists for an push model server that can, under host control, supply information to a designated remote client on a data network in response to communications with the remote client on a communications network separate and distinct from the data network.

DISCLOSURE OF THE INVENTION

Accordingly, one advantage of the invention is automatic establishment of connectivity with a remote node on a switched network in response to hypertext type data received on a packet data network.

Another advantage of the invention is the coordinated and simultaneous establishment of packet data and switched voice connectivity with a remote site so that different security levels of data can be communicated.

A further advantage of the invention is the ability of a server operator such as a merchant to interactively control data transmitted to a remote client on a data network in response to requests received from the client on a switched network.

Still another advantage of the invention is the provision of a network communications terminal system which retrieves from a data network the address of a remote node of a switched communications system, interprets and decodes the address date, and initiates connectivity with the remote node on the switched communications system.

According to one aspect of the invention, a terminal device retrieves information from a plurality remote information sites on a first communications network and, in response to the retrieved information, establishes communications with a remote node on a second communications network distinct from the first communications network. The terminal device includes a first communications interface connected to the first communications network for receiving address data (e.g., telephone number) from a selected one of the remote information sites. An output device is connected to the first communications interface for providing the address data, preferably on a visual display in the form of a video monitor. An input device, such as a mouse or trackball, is used to select, and thereby designate, the address data. A second communications interface is connected to the second communications network and, responsive to a designation of the address data by the input device, establishes communications with a selected one of the remote nodes corresponding to the address data.

According to a feature of the invention, the first communications network is a packet network such as the Internet while the second communications network is a switched network such as the public switched telephone network (PSTN) providing analog POTS or ISDN service. The first communications interface may include a Web Browser functionality for processing hypertext markup language (HTML) messages received from the Internet while the second communications interface may take the form of voice transmission and reception apparatus such as a conventional telephone. Thus, the first and second communications interfaces operate substantially simultaneously to provide digital packet data communications access to ones of the remote information sites while maintaining voice or modem based communications with the selected one of the remote nodes. The remote information site and remote node may be geographically collocated within the same facility.

According to another feature of the invention, the terminal includes the capability to supply information to the remote nodes identifying one of the HTML messages received from the internetwork so as to allow the remote node to associate and coordinate the communications conducted on the two communications networks.

According to another aspect of the invention, the first communications interface includes a first terminal application program system retrieving HTML messages from the selected remote site wherein the HTML messages have embedded therein (a) the address data, and (b) type information corresponding to the address data. The terminal application program also includes a display processor for displaying the HTML messages on the output device, e.g., video terminal, and for providing the address data in response to the input device, e.g., mouse, designating the address data displayed on the video terminal screen. A helper program launching functionality responds to the type information to activate the second communications interface and supply the address data thereto, i.e., launch, a telephone dialer program and pass the telephone number to be dialed. The type information may be encoded as a Multipurpose Internet Mail Extension (MIME).

According to a still further aspect of the invention, the first communications network is a packet data network and the first communications interface includes a packet network interface for communicating with the remote sites using Transmission Control Protocol/Internet Protocol (TCP/IP) network communications protocols. Access to the first communications network may be provided by an Integrated Services Digital Network (ISDN) interface connected to and supplying connectivity between the first communications interface and the first communications network. This ISDN interface may also be connected to and provide connectivity between the second communications interface and the second communications network. Thus, in a typical 2B+D ISDN configuration, each communications network includes an ISDN circuit having one B channel for transferring data, the networks sharing a common D channel for communicating via out-of-band signaling, information with the networks. The ISDN interface responds to the designation of the address data, i.e., the telephone number of the remote node, by supplying the address data to the second communications network on the ISDN D channel. The terminal may also include a conventional ISDN telephone instrument for establishing voice communications with the remote node on the second communications network.

According to an alternative aspect of the invention, the second communications network may take the form of a conventional analog switched telephone network, i.e., POTS network. In this case, the second communications interface could include (i) an autodialer having a tone generator for supplying in-band dialing information to the network using dual tone multi-frequency (dtmf) signals in response to the address data and (ii) an analog telephone circuit interface for applying the dtmf signals from the tone generator to the switched telephone network. The terminal device may additionally include a telephone instrument for providing real time duplex voice communications with the remote node over the second communications network in response to the second communications interface establishing communications with the selected one of the remote nodes. Typically, the telephone instrument would be an analog POTS telephone. To accommodate digital data transmissions, the second communications interface may alternatively or additionally include a modulator/demodulator (modem) connected to the second communications network for transmitting and receiving data to and from the selected one of the remote nodes.

According to a still further aspect of the invention, a data processing system interactively provides information to a remote client on a first communications network in response to a client request and under supervisory control of a system operator in direct communications with the client on a second communications network. The data processing system includes a first communications interface connected to the first communications network for receiving address data from the client. A server stores a plurality of pages of information and, in response to the address data, transmits on the first communications network a selected one of the pages of information to the client. The system further includes an operator terminal connected to the second communications network for receiving incoming calls thereon. The operator terminal is connected to the server and includes (i) a display indicating the selected one of the pages of information transmitted to the client, i.e., an indication of the most recent information requested by the client, and (ii) a server controller for supplying address data to the server to cause it to transmit another selected one of the pages of information to the client on the first communications network while the operator terminal remains connected to the client on the second communications network.

According to a still further aspect of the invention, a method of automatically establishing communications with a remote node of a switched communications network uses address data contained in hypertext data obtained from a packet data network distinct from the switched communications network. Hypertext information is retrieved from a remote information site on the packet data and displayed. A portion of the displayed hypertext is then designated or selected so as to identify the corresponding address data. Communications is thereupon established with the corresponding one of the remote nodes on the switched communications network.

The above and other objects, features and advantages of the present invention will become apparent form the following description taken in conjunctions with the accompanying drawings.

BEST MODE FOR CARRYING OUT THE INVENTION

Figure 1A:
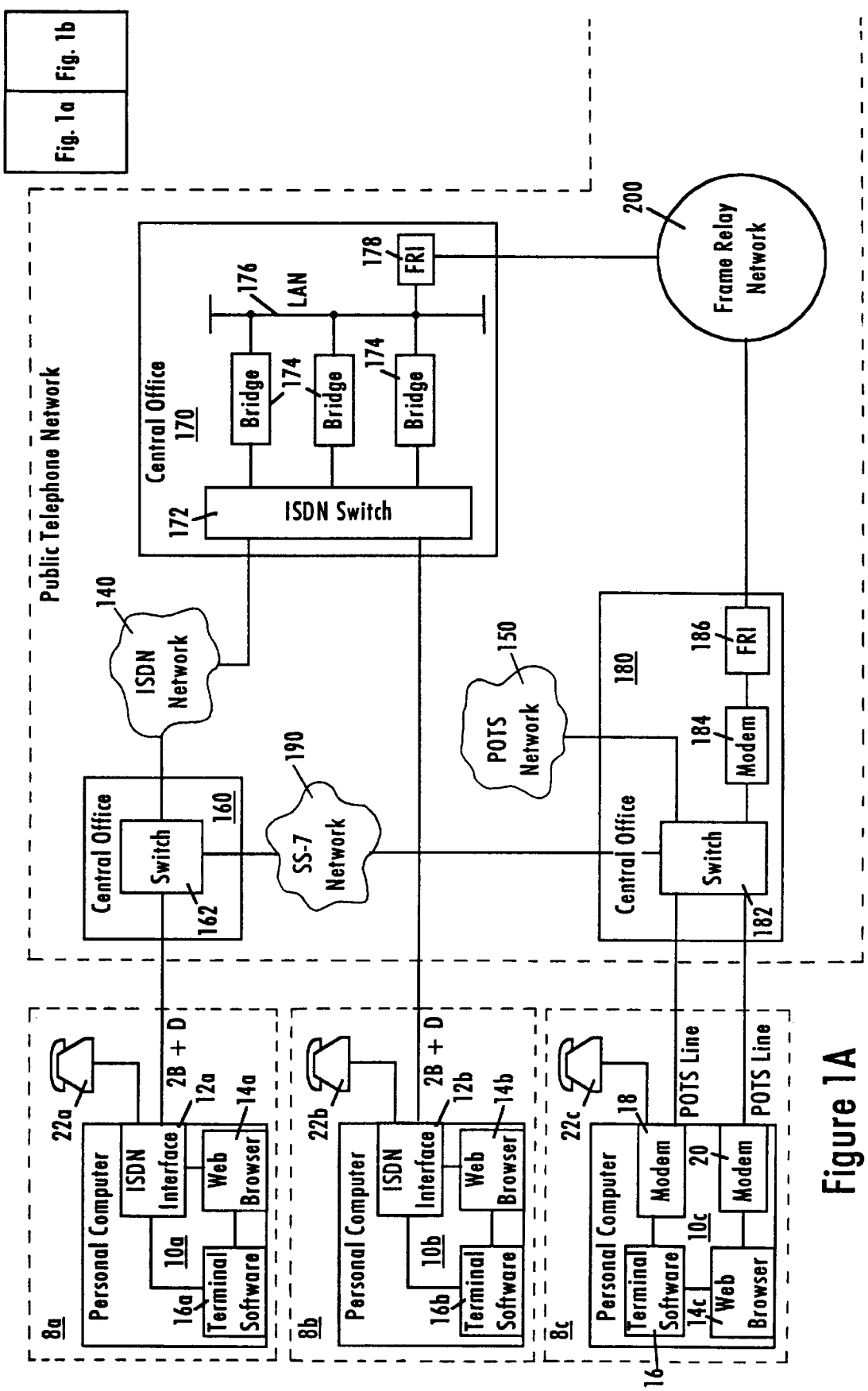
FIGS. 1A and 1B are a block diagram of terminal device and merchant sales facility including a server and sales representative workstations according to the invention illustrating some of the varied communications networks and configurations for interconnecting the remote terminal and server devices.
Figure 1B:
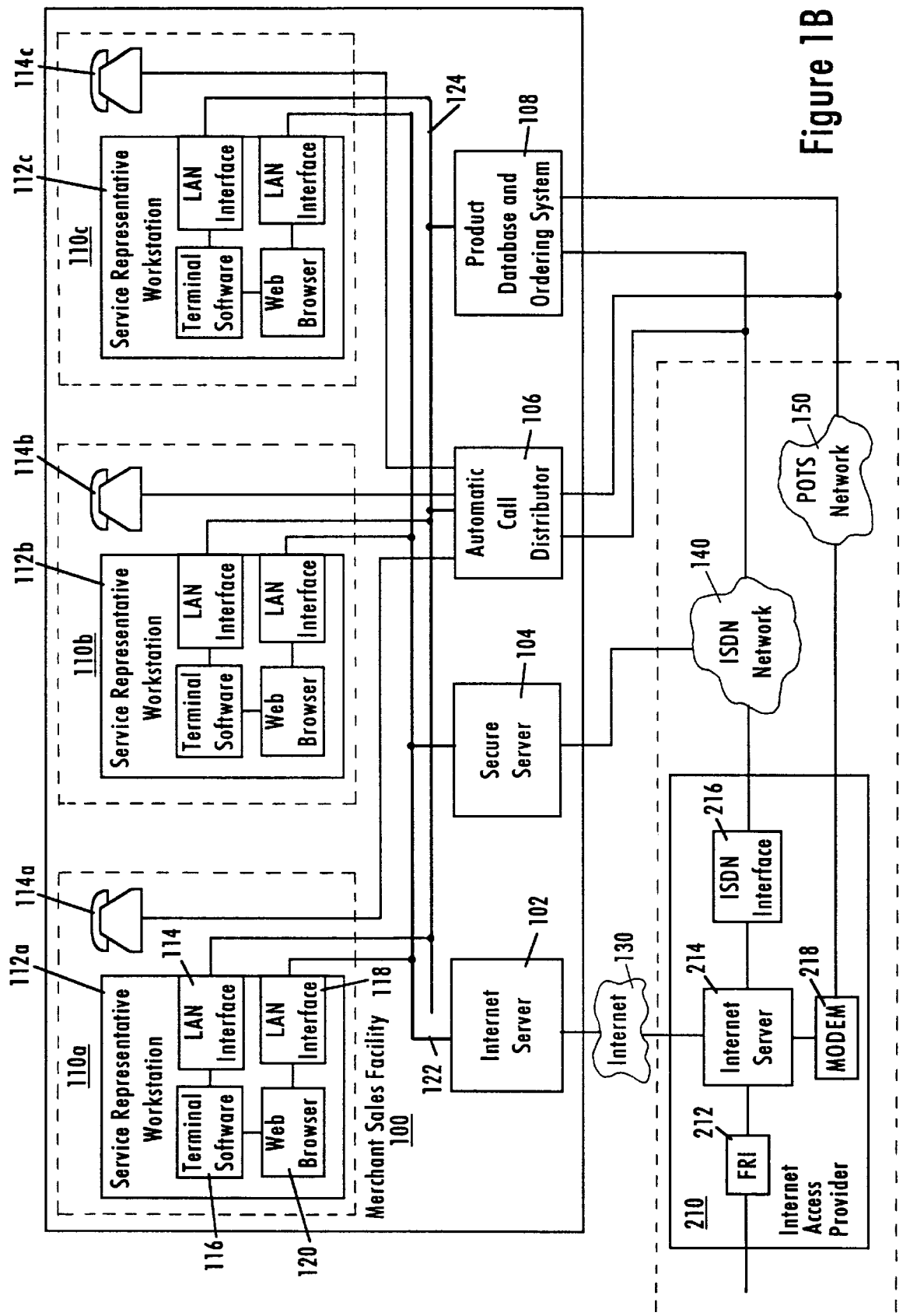

Referring to FIG. 1, personal computer (PC) 10a through 10c comprise conventional personal computer systems running operating systems such as Microsoft Windows or Macintosh System 7 are located at geographically diverse customer premises 8a through 8c. Terminals 10a–10c are located at respective customer locations and connected to respective telephone switching COs 160, 170 and 180.

Various elements of the public switched telephone network (PSTN) provide (i) packet data connectivity to Internet Access Provider 210 and Internet 130 and (ii) switched connectivity directly with a Merchant Sales Facility 100. Merchant Sales Facility 100 is directly connected to the Internet 130 and to Integrated Services Network (ISDN) and POTS Network facilities 140 and 150. (Note, as used herein, the PSTN includes, but is not limited to, the ISDN and POTS networks.)

Each of client computer terminals 10a through 10c has a slightly different arrangement for accessing the Internet and the PSTN. Client computer terminals 10a and 10b each include a basic rate interface (BRI) ISDN Interface 12a and 12b for providing (i) one 64 kbps B channel to Web Browser 14a–14c and (ii) another 64 kbps B channel to telephones 22a, 22c and terminal software 16a, 16b. ISDN Interfaces 12a and 12b may be CyberSpace Freedom Series Commuter Cards made by ISDN*TEK which combine the B channels and a D channel used for telephone signalling into a single two or four wire output, connecting to respective COs 160, 170 over a standard two-wire local telephone loop. Telephone sets 22a, 22b are connected to respective ISDN interfaces 12a, 12b to provide switched voice and/or data communication. COs 160 and 170 include ISDN switches 162 and 172. Switch 162 is linked through switch 172 to frame relay network 200 via an ISDN Network 140 operating at 64 Kbps. Switches 172 and 162 may be coupled to the network 140 through trunks.

In another arrangement, client computer terminal 10c is connected to its associated CO 180 on a pair of analog POTS lines. Instead of a single ISDN interface, terminal 10c has two modems: (i) a first modem 18 (a) supporting terminal software 16 and voice telephone 22c and (b) performing autodialing functions; and (ii) a second modem 20 dedicated to Web Browser 14c. Modems 18 and 20 are connected to the associated CO 180 over a pair of standard analog POTS lines. Switch 182 routes calls from modems 18 and 20 based on the dialed digits transmitted by the modems using in-band dtmf (dual tone multi-frequency) signalling. For this example, terminal software 16 is assumed to cause modem 18 to initiate a call over the PSTN POTS network by dialing the voice or modem telephone number of Merchant Sales Facility 100 while Web Browser 14c causes modem 20 to initiate packet data connectivity over Frame Relay network 200 to Internet Provider 210 by dialing a telephone number associated with modem 184 and Frame Relay Interface (FRI) 186. Alternatively, Web Browser 14c may be programmed to establish data communications with Internet Provider 210 through switch 182 through POTS Network 150 and modem 218 by dialing the appropriate POTS access telephone number of Internet Provider 210.

A Frame Relay Interface (FRI) 178 is arranged at CO 170 to interface frame relay network 200 with the CO equipment. A multiplexer provided with a frame relay interface card and T1 interface card, for example Integrated Packet Exchange (IPX) multiplexer, may be used to support the frame relay interface FRI 178. Alternatively, a frame relay access devices (FRAD) may provide the required frame relay interface. Many other types of high-speed network may be used as network 200, for example, a cell relay network, or Switched Multimegabit Data Service (SMDS) network.

The frame format used for the transmission across the frame relay network is defined in the CCITT Recommendation 1.441/Q921. In particular, the first and last fields of the frame serve as flags, each being one octet long. The second field is the address field taking up two octets. The third field is provided for user data and can comprise any number of integral octets up to 4096. The fourth and fifth fields are reserved for Frame Check Sequence (FCS), each one octet long. The address field is based on the ANSI T1.618 standard and includes a 10-bit Data Link Connection Identifier (DLCI) that ranges from zero to 1023. The DLCI identifies the logical channel connection within the physical channel or port for a predetermined destination. Also, the address field comprises congestion control bits that provide Forward Explicit Congestion Notification (FECN) and Backward Explicit Congestion Notification (BECN) to notify remote users of the congestion encountered by the frame transmitted across the physical medium. A Discard Eligibility bit (DE), also residing in the address field, indicates (when set to 1) that the frame should be discarded during congestion conditions. This bit is used by carriers to determine what data they will discard when the total traffic exceeds network bandwidth resources.

Each of the central offices 170 and 180 connected to the frame relay network 200 is identified by its own DLCI address. The frame relay frame is received by the FRI 178 via a T1 frame relay access line where it is translated into the LAN format packet. The FRI 178 is coupled to an Ethernet LAN 176 arranged at the CO 170. It is understood that Ethernet LAN 176 may alternatively be any local area network such as a token ring topology. Bridges 174, incorporated into the Ethernet LAN 176, interface to ISDN switch 172 arranged at the CO 170. The Ethernet bridging may be performed using the Transmission Control Protocol/Internet Protocol (TCP/IP) or other appropriate protocols. ISDN switch 172 provides the remote subscribers with Centrex services supported by ISDN lines that couple client computer terminals 10a and 10b to CO 170. The remote subscribers can gain access through the ISDN lines to a variable sized multi-line hunt group in the central office for connection via the bridges to the LAN 176. The arrangement that link the ISDN switch 172 with the frame relay network 200 via the LAN 176 is disclosed in more detail below.

As known in the art, a Centrex switch provides services of a digital Private Branch Exchanges (PBX). However, unlike the digital PBX, Centrex performs switching functions in equipment located in the telephone company's central office as opposed to the customer's premises. Based on the ISDN capabilities, the ISDN Centrex switch 172 provides the remote subscribers with voice, image and data transmission. A hot line service may be established to allow the subscribers to use two digit speed calling to Internet Access Provider 210. Teleconference services like Centrex Group Voice Inter-com calling as well as a Centrex Group Circuit Switched Data Inter-com calling may be provided via the ISDN lines. Further, the subscribers are enabled to call locally or via a Long-Distance carrier not only to the data center but also to each other or to any other destinations. Enhanced Centrex services, for example a Voice Mail and Bulk Long Distance rates, are also available.

A primary rate interface (PRI) and/or a basic rate interface (BRI) may be provided between the ISDN switch 172 and each of the bridges 174. This ISDN T1 access interface comprises twenty-three B-channels each at 64 Kbps and one D-channel at 64 Kbps. Client computer terminal 10b is coupled to the ISDN switch 172 via ISDN BRI lines. This ISDN access interface comprises two B-channels each at 64 Kbps and one D-channel at 16 Kbps. One of the B-channels may be used for image and digital data transmission to and from the Internet, and another for switched voice and/or data communication.

Figure 2:
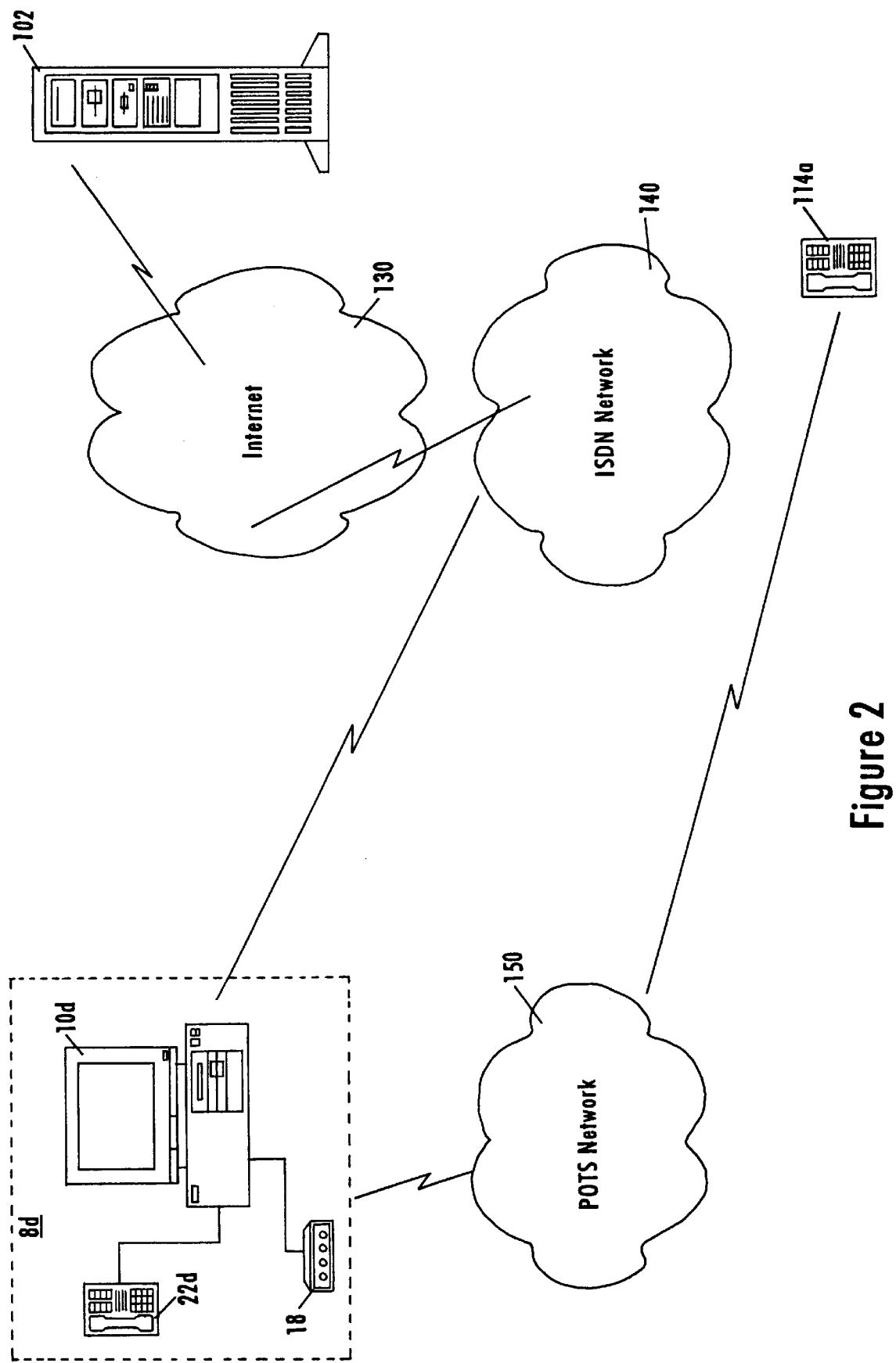
FIG. 2 is a block diagram of a client terminal connected to a merchant's server using the ISDN/Internet networks with corresponding voice communications carried by the analog POTS network.
Figure 3:
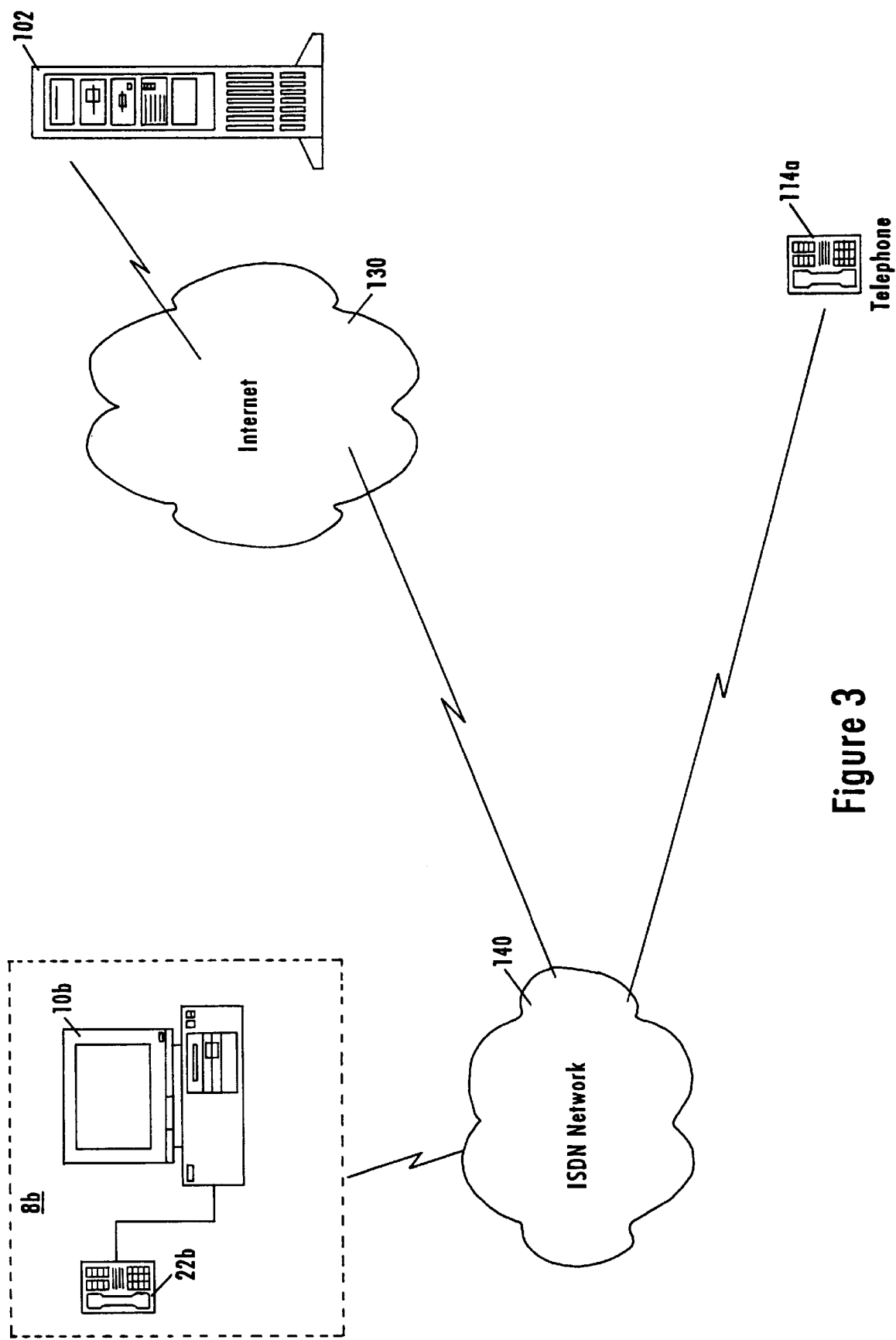
FIG. 3 is a block diagram of a client terminal connected to a merchant's server using the ISDN/Internet networks with corresponding voice communications also carried by the ISDN network through a common ISDN interface card in the client's computer terminal.
Figure 4:
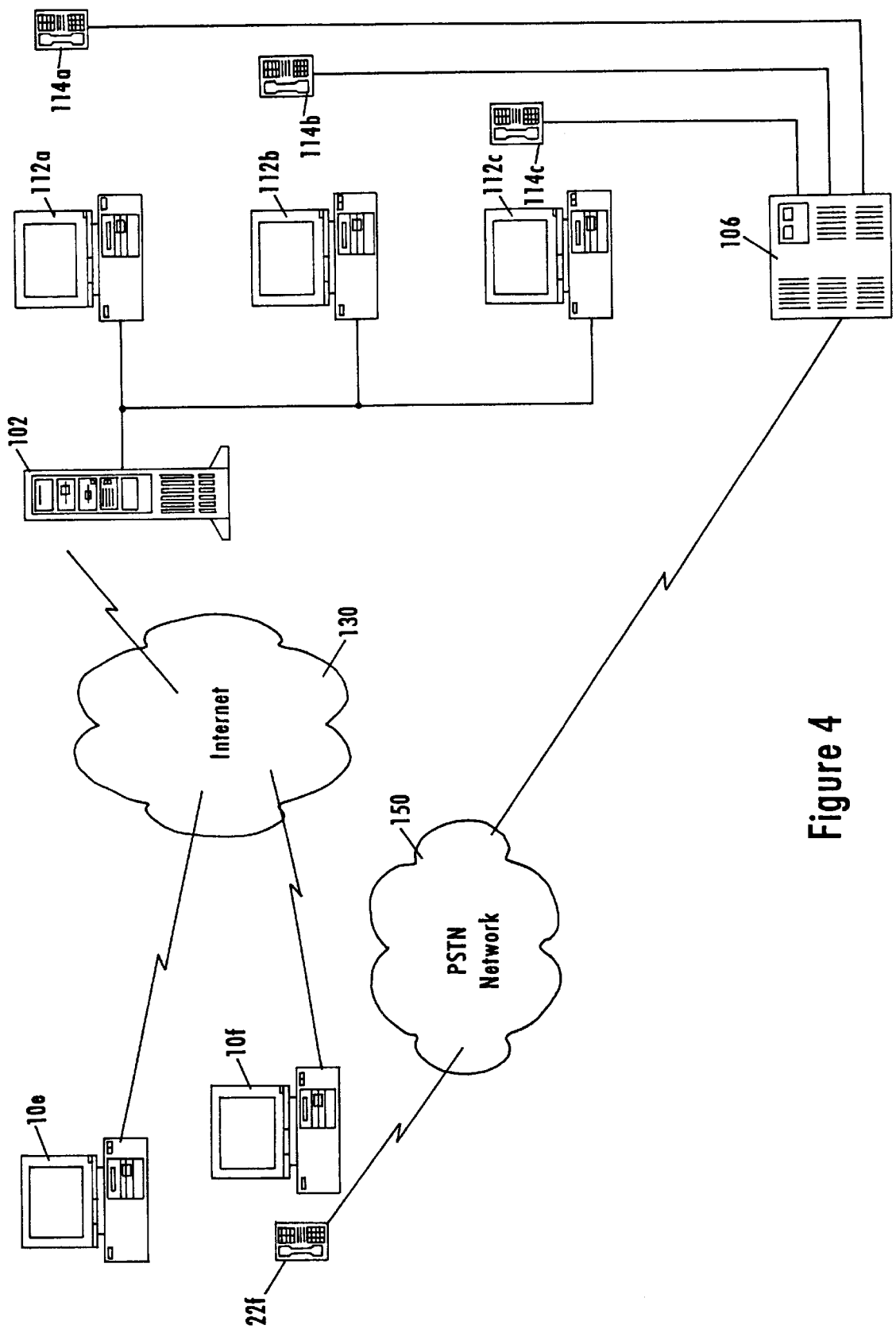
FIG. 4 is a block diagram of a client computer terminal connected to a merchant's server directly through the Internet with corresponding voice communications carried by the analog POTS network and routed at the merchant sales facility using a PBX.
Figure 5:
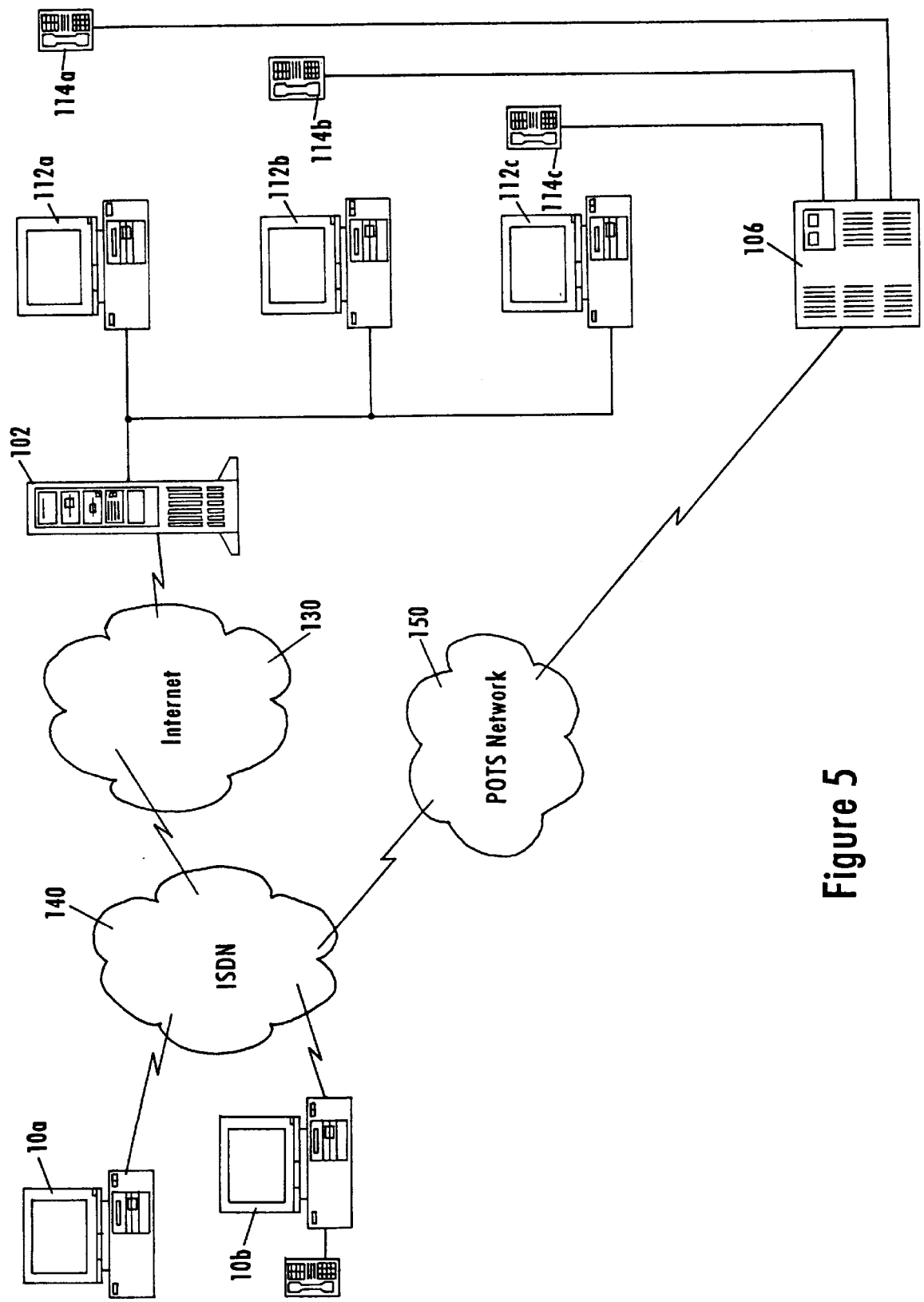
FIG. 5 is a block diagram of a client terminal connected to a merchant's server using the ISDN/Internet networks with corresponding voice communications also carried by the ISDN network through a common ISDN interface card and transitioned to the POTS network for delivery to the merchant's analog PBX.

Within the networks shown in FIG. 1 are various architectures for providing connectivity between client locations and Merchant Sales Facility 110. For example, in FIG. 2 is a client computer terminal 10d is connected to a merchant's server 102 using the ISDN/Internet networks 140/130 with corresponding voice communications carried by the analog POTS network 150. With reference to FIG. 3, a client computer terminal 10b is connected to a merchant's server using the ISDN/Internet networks 140/130 with corresponding voice communications also carried by ISDN Network 140 through a common ISDN interface card (not shown) in the client's computer terminal. In FIG. 4, client computer terminals 10e, 10d are connected to a merchant's server 102 directly through the Internet 130 with corresponding voice communications carried by the analog POTS Network 150 and routed at the merchant sales facility using a PBX/ACD 106. FIG. 5 depicts client terminals 10a, 10b connected to a merchant's server using the ISDN/Internet networks 140/130 with corresponding voice communications also carried by the ISDN Network 140 through a common ISDN interface card (not shown) and translated to the POTS Network 150 for delivery to the merchant's analog ACD/PBX 106.

With reference again to FIG. 1, COs160, 170 and 180 are interconnected via the Signaling System 7 (SS7) network 190 which provides out-of-band switching communications between the switches and forms part of the Advanced Intelligent Network (AIN), the latter described more fully in Kay et al., "Area Wide Centrex," U.S. Pat. No. 5,247,571 issued Sep. 21, 1993 and McConnell, "Subscriber Control to Access Restrictions on a Plurality of the Subscriber's Telephone Lines," U.S. Pat. No. 5,436,957 issued Jul. 25, 1995, both of which are wholly incorporated herein by reference.

Merchant Sales Facility 100 includes interfaces to the Internet 130, ISDN Network 140 and analog POTS Network 150 to provide various combinations of voice and data connectivity. Each Sales Representative Workstation 110a through 110c includes a respective telephone instrument 114a–114c and computer terminal 112a–112c used to access (i) Internet Server 102 on network 122 and (ii) Secure Server 104, ACD 106 and Product Database and Ordering System 108 on network 124. Internet Server 102 is connected to Internet 130 via a leased line, typically providing T1 grade service at 1.544 mbps. Alternative connectivity may be provided, including lower rate BRI ISDN or POTS lines as shown in connection with the client facilities, or higher rate SMDS or T3 lines (not shown.)

Secure Server 104 provides duplicative and/or similar information to that resident on Internet Server 102, but using switched access via ISDN Network 140. Similarly, Product Database and Ordering System 108 provides information about products and includes an ordering system to allow both sales representatives (via network 124) and customers (via ISDN Network 140 and POTS Network 150) to obtain product information and place orders for products. Finally, ACD 106 terminates voice calls received on ISDN Public Network 140 and POTS PSTN 150 and routes the calls to an available sales representative workstation 10a–10c.

Caller information is also provided by ACD 106 to the representative computer terminals 112a–112c via network 124. This information may include (i) the number of the calling party (CID) received from the PSTN via caller ID, ANI, ISDN D channel, etc., (ii) data associated with that CID (e.g., customer location, name, etc.) retrieved from a customer database (not shown), (iii) preliminary information automatically solicited from the caller by a voice response unit (VRU) capability of the ACD (e.g., purpose of call, products of interest, session number of prior Internet access, etc.), (iv) general system statistics (caller wait time, calls on hold, etc.) and other information.

Figure 6:
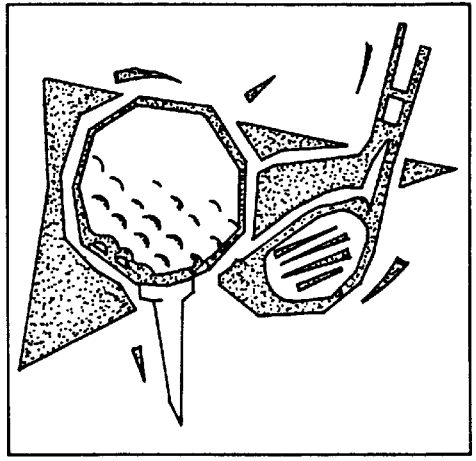
FIG. 6 is a graphical representation of a sample Web page including a HTML hot link to initiate a telephone call to a merchant.
Figure 6:
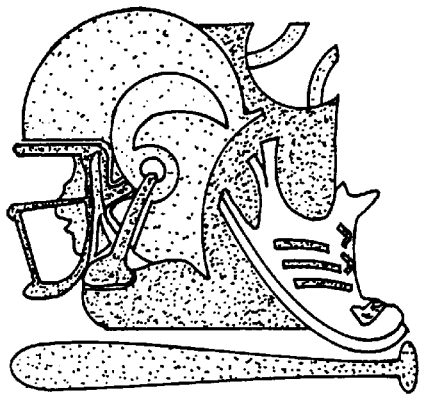
Figure 6:
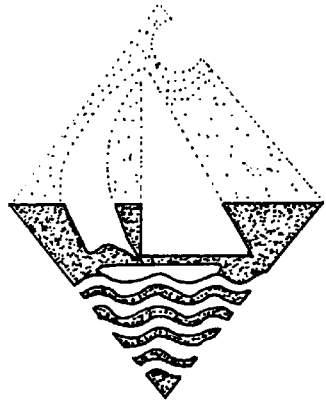

According to one mode of operation of the system according to the invention, a caller uses a Web Browser 14a–14c to initiate access to the Internet via an Internet Access Provider 210. Once access is obtained, the user can "surf the net", or, if the URL of the Merchant's home page is known, go directly to that home page, i.e., initiate a connection with the Merchant's Internet Server 102 which responds by sending the client the specified resource. The resource in this case may be an HTML document as shown in FIG. 6. At the bottom of the page, enclosed in triangular brackets ("<>") in the figure, are hyperlinks 230 to automatically dial the Merchant Sales Facility 100. Clicking on the portion of the screen displaying the respective telephone numbers causes the Web Browser to request and retrieve a second resource from Internet Server 102 corresponding to the selected telephone number. The retrieved resource includes address information, i.e. the merchant's telephone number to be dialed, and a MIME type associated with the autodialer command. Upon receipt of this data, the browser examines the MIME type, associates it with an autodialer functionality, launches the autodialer and passes the telephone number to be dialed to the autodialer.

The autodialer function may be part of a conventional terminal software utility or application written to a Hayes compatible Telephony Application Programming Interface (TAPI) standard for Microsoft Windows. Alteratively, the autodialer functionality may be included as an applet embedded within a merchant's web page. Thus, the HTML object supplied by Internet Server 102 incorporates not only the telephone number to be dialed, but the executable content required to perform the autodial and related functions. For example, the autodial applet may not only dial the Merchant Sales Facility 100 but, in response to establishment of the connection, automatically request and/or identify the session ID from/to ACD 106. The JAVA language may be used for such an applet with Web Browser 14 being JAVA or HotJAVA compatible.

Figure 7:
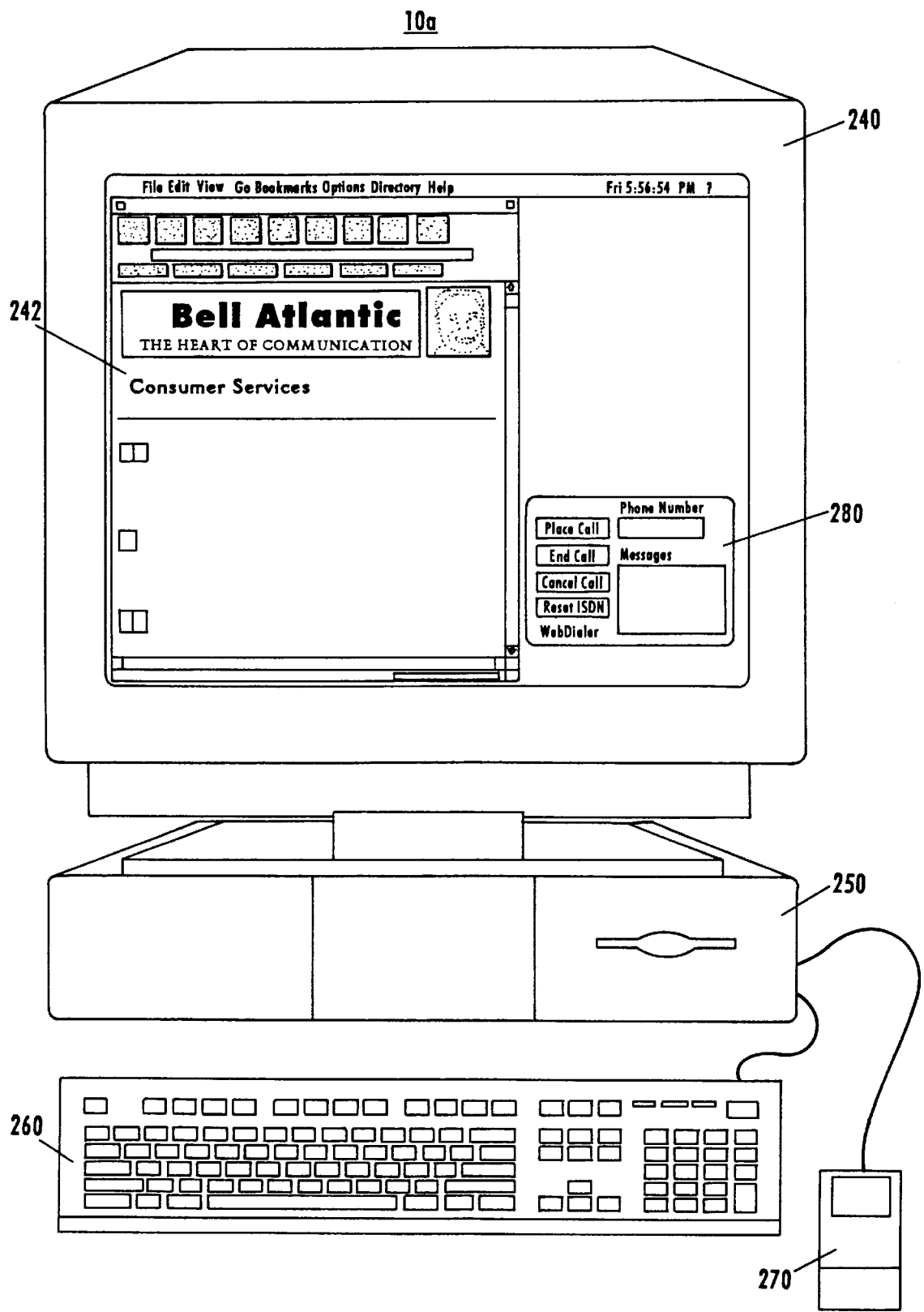
FIG. 7 is a graphical representation of a client terminal running the Netscape browser displaying (i) a partial page of HTML format hypertext and (ii) a control panel for initiating a telephone call to a merchant.

FIG. 7 depicts activation and display of an autodialer control panel. Client computer terminal 10a includes a standard color video monitor 240, PC 250, keyboard 260 and graphic input device in the form of mouse 270. Running on PC 250 and displayed on the left portion of monitor 240 is the Netscape Web Browser 242. Also running is the "WebDialer" telephone autodialer software, the control panel 280 displayed in the lower right portion of monitor 240.

Figure 8A:
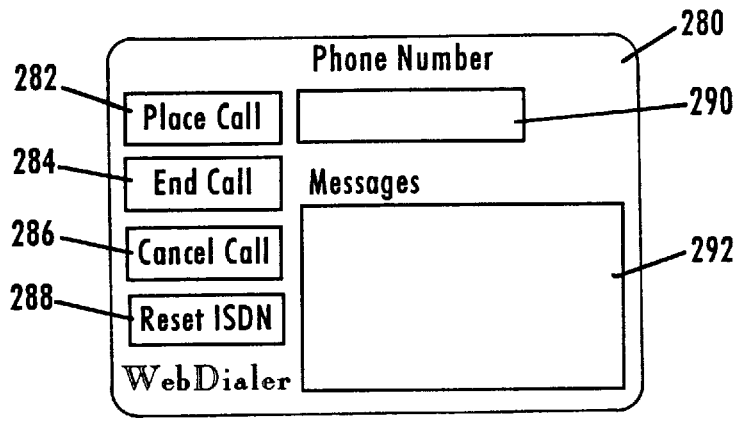
FIG. 8A is a graphical representation of a blank telephone autodialer control panel.

The autodialing sequence followed by autodialer software is best understood with reference to FIGS. 8A through 8F. A blank control panel for the autodialer is shown in FIG. 8A. This display might result from manual activation of the software. The control panel includes a column of soft buttons 282–288 to place, end and cancel a call and to rest the ISDN Interface. Telephone number window 290 displays the telephone number to be dialed and allows the user to alter the number as necessary, for example to insert carrier selection digits or calling card information. Message Window 292 displays the status of the autodialer and dialing status and progress.

Figure 8B:
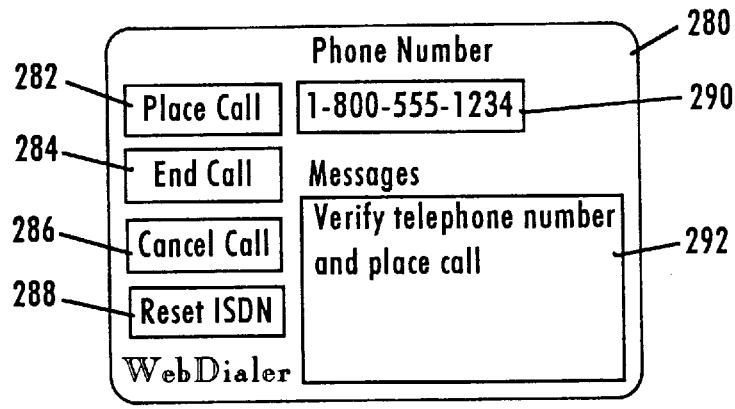
FIG. 8B is a graphical representation of a telephone autodialer control panel displaying a hot-linked telephone number and a message requesting verification thereof.

When "launched" by the Web Browser or initiated as a browser run applet, however, the autodialer would additionally receive and display the number to be dialed in Telephone Number Window 290 as depicted in FIG. 8B. The autodialer requests confirmation that the number displayed should be dialed prior to initiating an outgoing telephone call. While all outgoing telephone calls might be subject to such verification by the operator, predefined parameters might be established to distinguish between telephone numbers to be automatically dialed and those requiring manual operator authorization. For example, the autodialer may be configured to automatically dial the proposed telephone number if it is either a local call or a toll free "800" or "888" area code, to block or abort if a "900" area code is proposed, and request operator verification prior to dialing any other telephone numbers. Of course, the autodialer might also be programmed to exclude or allow specific area codes, exchanges and/or telephone numbers. The operator may also be required to enter an personal identification (pin) code or a credit card authorization prior to dialing.

Figure 8C:
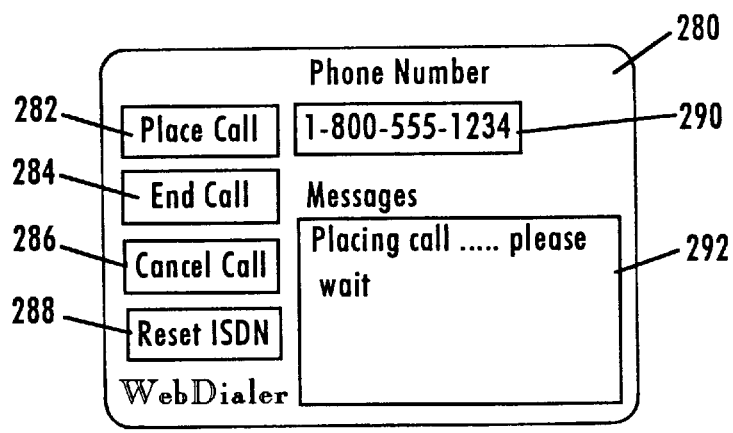
FIG. 8C is a graphical representation of a telephone autodialer control panel upon initiation of a dialing sequence by the user.
Figure 8D:
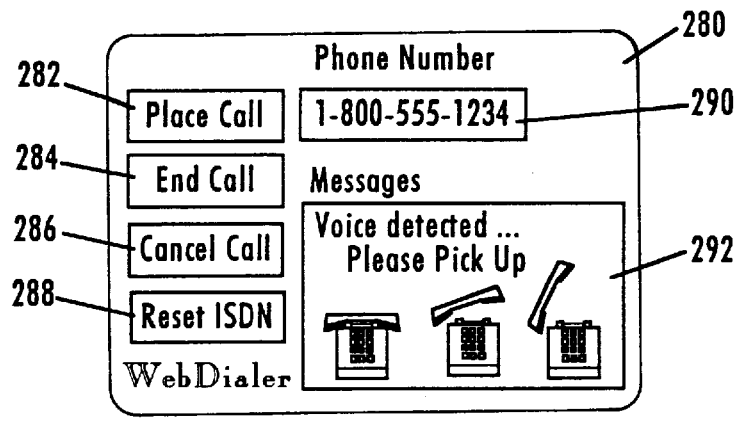
FIG. 8D is a graphical representation of a telephone autodialer control panel upon establishment of voice communications with a called party.
Figure 8E:
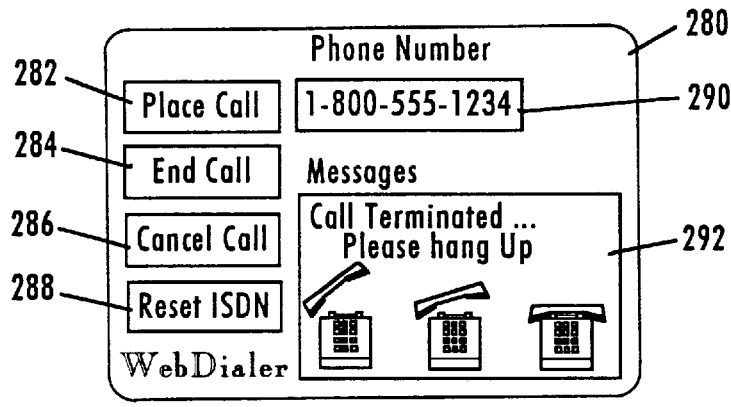
FIG. 8E is a graphical representation of a telephone autodialer control panel upon call completion to a voice circuit.
Figure 8F:
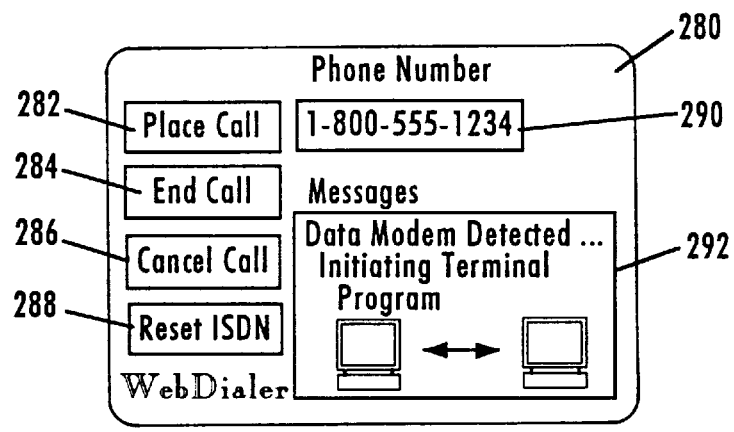
FIG. 8F is a graphical representation of a telephone autodialer control panel upon detection of a data modem at the called number and initiation of a terminal program.

Once the autodialer function initiates a telephone call, either using a second B channel or a second POTS line, the autodialer Message Display Window 292 indicates that the call is in progress as depicted in FIG. 8C. If no data, fax, video, or other recognizable modem answer signals are detected upon call answer, or if voice is detected, the autodialer function indicates that the operator should pick up the telephone as depicted in FIG. 8D. Similarly, as shown in FIG. 8E, a message to hang up the telephone might be displayed once the autodialer detects that the call has been terminated based on either D channel signaling messages or by a momentary reversal of battery on a POTS line, i.e., a "wink" signal. Alternatively, if a modem is detected, then the appropriate message is displayed as depicted in FIG. 8F.

In the case of a data modem, the autodialer may additionally activate the appropriate terminal software or, if the dialed server is known or detected to use standard Internet protocols (e.g., TCP/IP), the Web Browser software might be additionally enlisted to communicate over this second channel established by the autodialer while simultaneously providing Internet access previously established on the first channel. Similarly, facsimile or video signaling would cause the autodialer to activate the appropriate facsimile or video terminal software.

Figure 9:
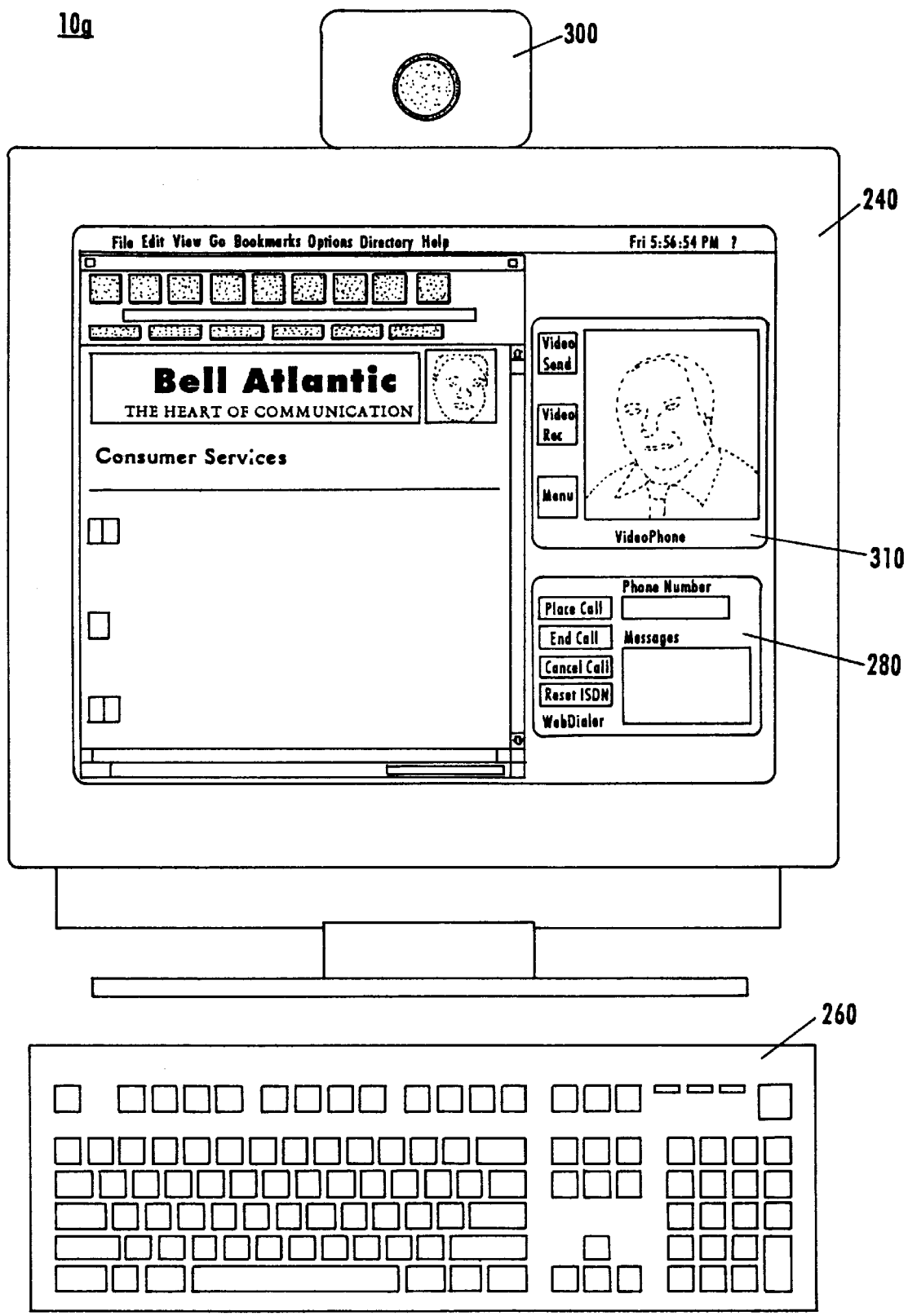
FIG. 9 is a graphical representation of a client terminal running the Netscape browser upon initiation of a simultaneous video conference with a party called using the dialer function.

FIG. 9 depicts such a configuration wherein the autodialer has been used to establish a video-teleconferencing link with a remote party over a switched network while Internet access is maintained on a data packet network. In this case, PC log includes video camera 300 viewing the operator/customer. Compressed video received via the autodialed connection is displayed in Video Window 310. Transmission and reception of video and associated audio is supported by a conventional video coder/decoder (codec) incorporated into PC 10g. While one B channel might be used for each Internet and video-teleconferencing, a preferred embodiment uses both B channels to accommodate the larger bandwidth needed for video-teleconferencing connectivity and an analog POTS line or third ISDN B channel is used to establish and/or maintain background Internet availability during the video-teleconference.

Figure 10:
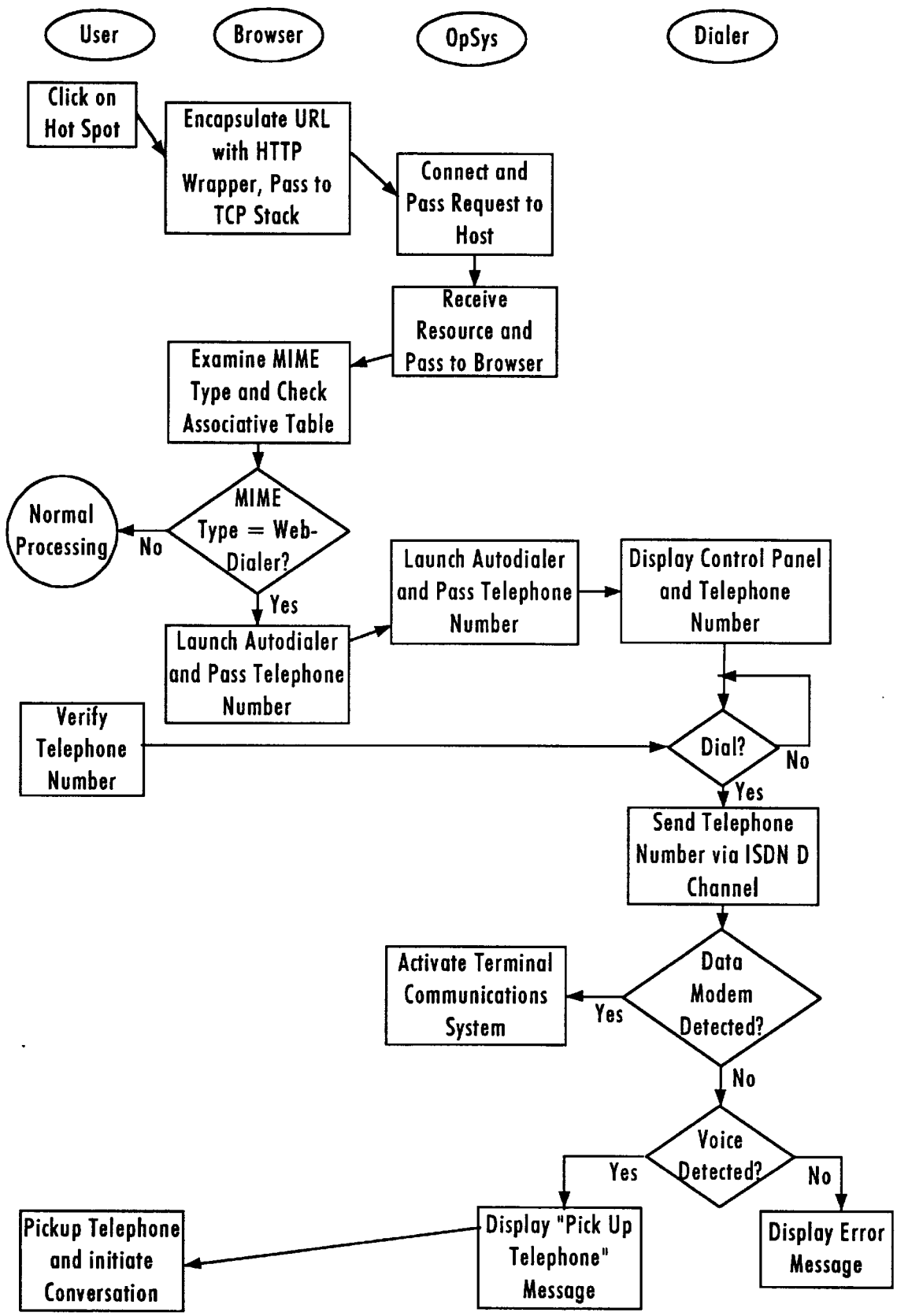
FIG. 10 is a flow diagram of system processing during dialing operations.
Figure 11:
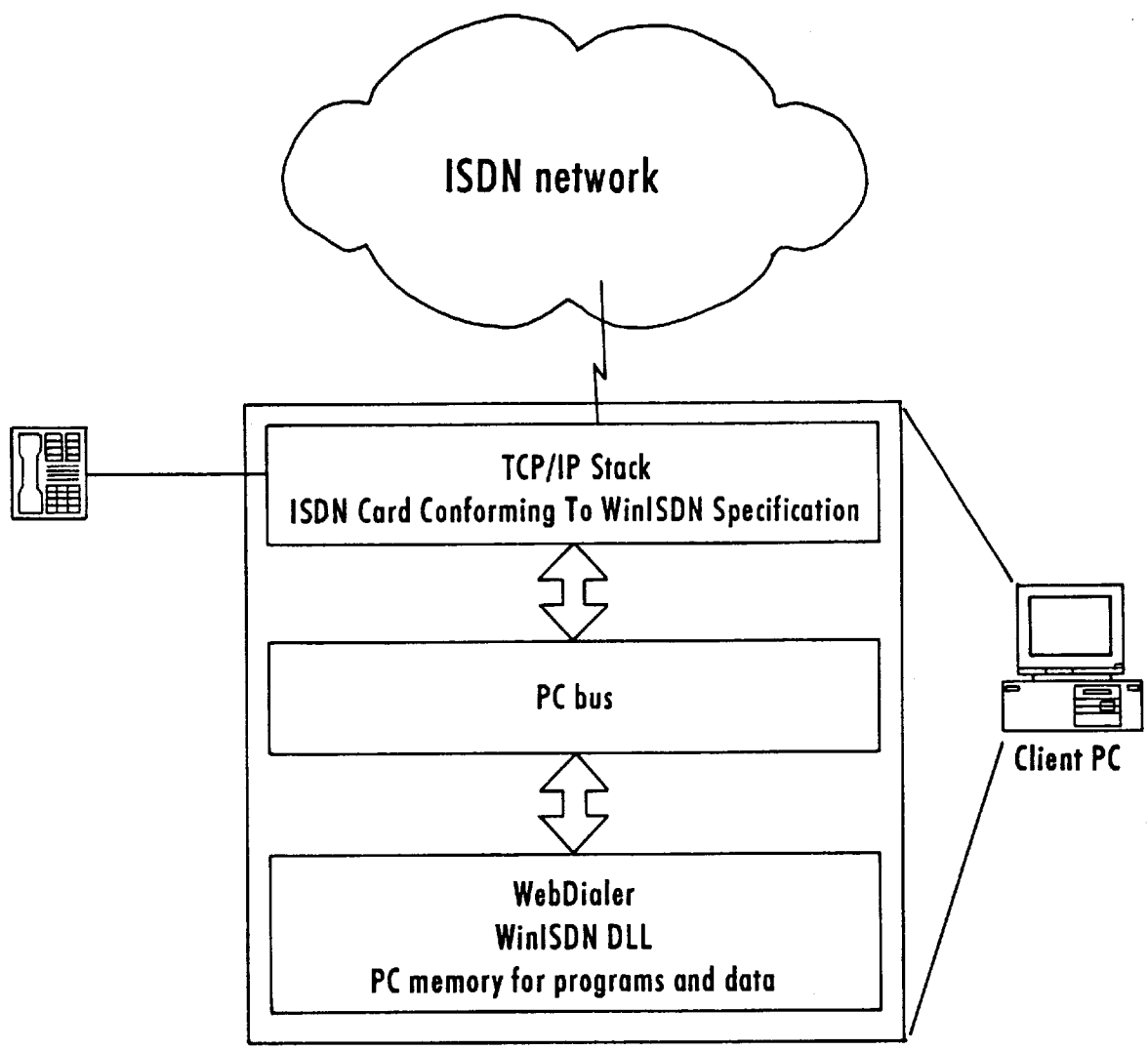
FIG. 11 is a diagram of the layered relationship between the dialer application and ISDN interface.
Figure 12:
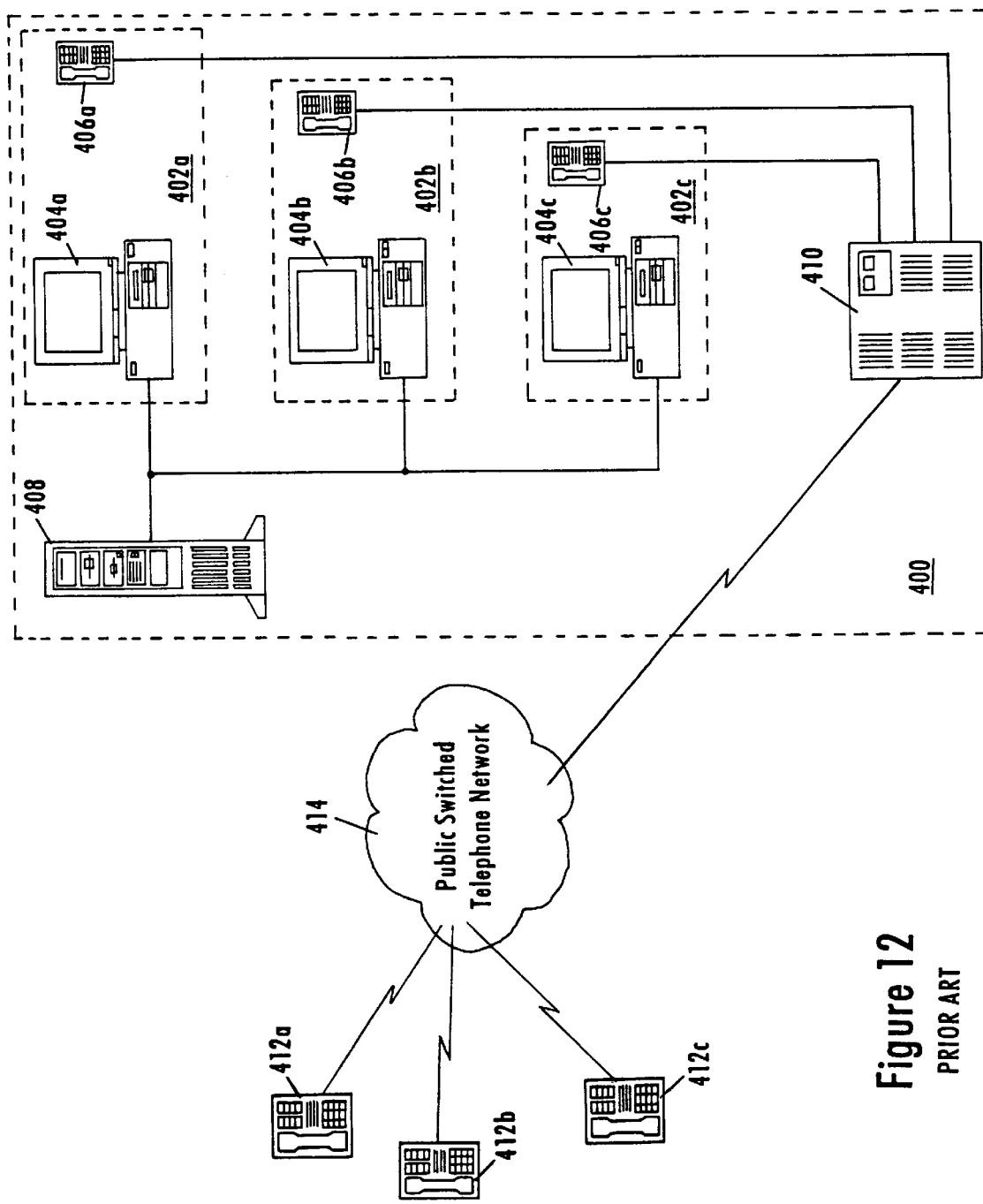
FIG. 12 is a block diagram of a merchant's telephone sales facility according to the prior art.
Figure 13:
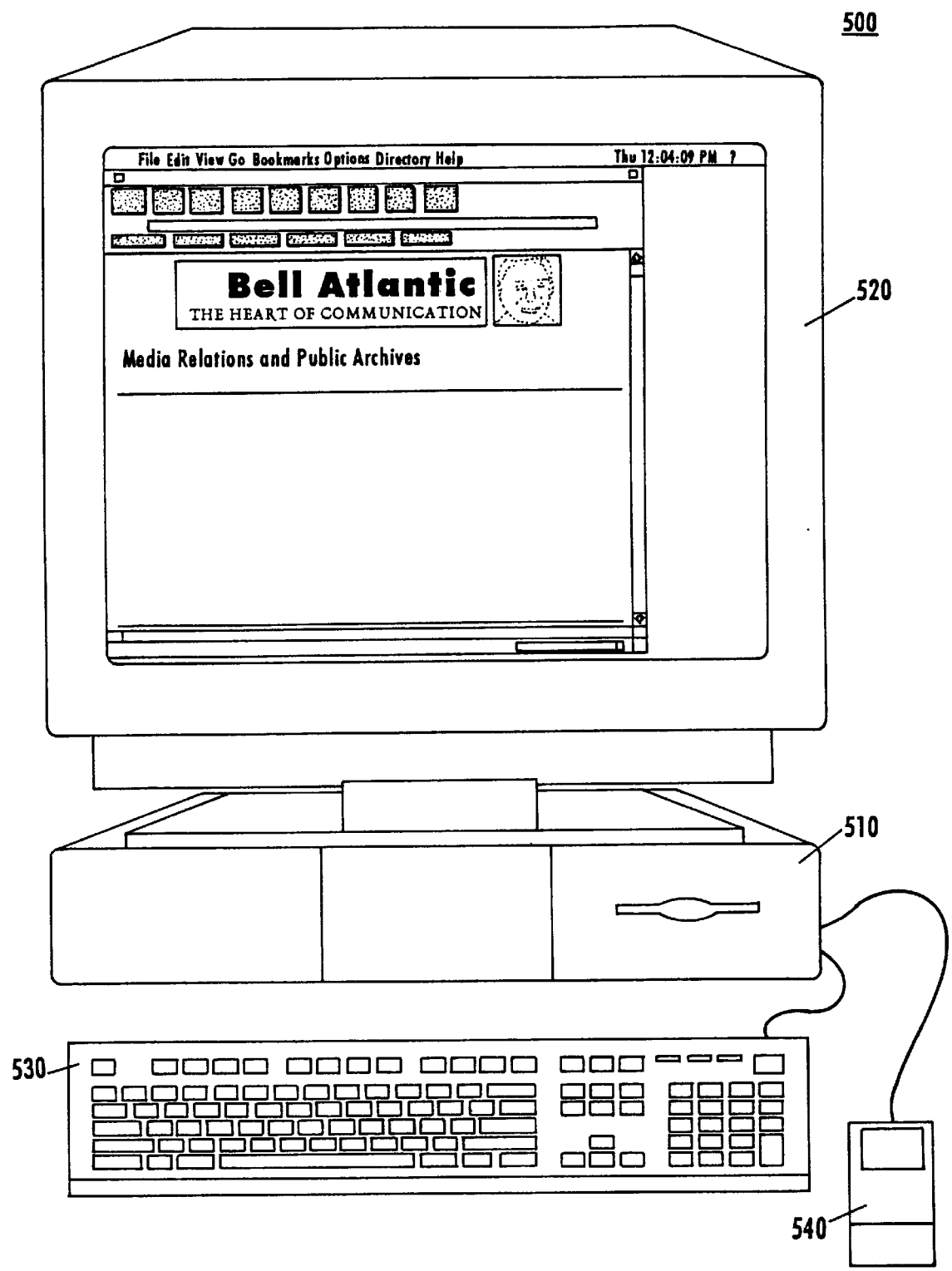
FIG. 13 is a graphical representation of a client terminal running the Netscape browser according to the prior art.

With reference to FIGS. 10 and 11, a method of establishing connectivity with a remote site based on hypertext format messages is initiated by a user clicking on the appropriate hot spot or hypertext of the Merchant's Web page. This causes the Web Browser to encapsulate the appropriate URL with an HTTP wrapper and pass the message to the Windows operating system TCP stack. The operating system connects to and passes the request to the host server which responds with the requested resource. The operating system receives and passes the resource to the browser which examines the MIME type to determine if it should launch the autodialer helper program. Alternatively, if the resource includes an applet, the executable content of the applet forms the autodialer which is executed by the Web Browser directly.

If the autodialer helper program is launched, it initiates a dialing sequence, optionally requesting the operator to verify or authorize dialing of the displayed telephone number. The autodialer then monitors the telephone line to detect modem signalling that might require that some other communications application be initiated. If no special application answer signalling is detected or recognized, or if voice is detected, then the autodialer indicates to the operator that the call has been completed and to pick up the telephone. Of course, if the terminal being used by the operator already includes voice telephone capabilities, then the autodialer may automatically activate that feature to enable a "hands free" conversation.

Another important feature of the invention is the coordination of this newly placed call with previous connectivity established by the client on the Internet. In particular, the sales representative should be provided with information about the product information accessed by the client immediately prior to initiation of the call so that the representative can be prepared to respond to further client requests.

With reference again to FIG. 1, one method of coordinating between Internet accesses and incoming calls is to cause Internet Server 102 maintain a record of pages accessed by a particular client, i.e., a session history, and to issue a session identification number ("session ID") to a client upon the client requesting a HTML page including autodialing hyperlinks. The sales representative solicits the session ID from each caller upon initial contact and uses it to retrieve the session history for that client from the Internet Server 102 using workstations 112a–112c. Upon inputting the session ID, the client's session history is automatically downloaded into the Web Browser 120 used by the sales representative so that the current and immediately preceding pages accessed by the client from Internet Server 102 are available for viewing by the sales representative. Alternatively, a vru function of ACD 106 would request this information from the client which would then be either (i) transmitted automatically by the autodialer using dtmf or other protocol, (ii) manually input by the customer using the autodialer or telephone dtmf keypad, or (iii) spoken by the client and recorded by the vru for playback to the Sales Representative or provided to a speech recognition function. In still another embodiment, session ID information transmitted by the autodialer is passed via the SS-7 system and ISDN network to ACD 106. Based on the session ID, client session history, and other data including CID, customer geographic location, time of day, etc., ACD 106 routes the call to the appropriate sales representative workstation 110a–110c together with the associated customer information.

Still another method of establishing a correspondence between a client Internet session and an incoming call is best explained by way of the following example. Assume an Internet Server 102 having Home Pages constituting a catalog. The Home Page also has the merchant's phone number imbedded within it. The phone number has a MIME type association that can trigger a dialer utility such as the autodialer application. The Home Page also contains a "hot spot" that will cause the Internet Server 102 to establish a session ID. According to the example, the user has a normal home PC 10a setup with a dial-in connection to the Internet via an ISDN connection, a telephone 22a connected to the ISDN card, and a copy of the autodialer. The customer's Web Browser 14a–14c makes a connection to a Home Page on the merchant's Internet Server 102. When the server receives the request it services it just like any other request. If the user clicks on the phone number the autodialer application is triggered and establishes a conversation with one of the sales representatives. The customer, probably at the sales representative request, clicks on the hot spot that creates a session ID. When the server receives the request for a session ID it generates the ID, interrogates the request and obtains the return address. The return address, the session ID, and the page ID that is on the viewers screen are saved to a data base in Internet Server 102.

The "push" model server requires a compatible browser that will accept HTTP messages directed to its TCP/IP return address even in the absence of an outstanding request from the client to the server. The server then can download HTML data to the browser under local control (i.e., server "push" of the data ) rather than merely responsive to a client request (i.e., client "pull.") Alternatively the autodialer may periodically poll the server for data by causing the browser to initiate a connection to the Merchant's Internet Server 102 on a regular interval and download any new data made available under control of the sales representative.

The user tells the sales representative the session ID that has been returned. The operator then interrogates the data base of Internet Server 102 and brings up on the operator screen a window that contains a copy of the Home Page the user is viewing. The sales representative can now direct Internet Server 102 to "push" a different Home Page to the viewer. A copy of this Home Page is also displayed on the sales representative's Web Browser screen.

Other methods may be used in place of or supplementing customer transmission of a session ID. For example, the customer's CID may be stored by the respective Web Browser and provided to Internet Server 102. CID information from incoming calls would then be provided by ACD 106 and associated with the corresponding session history associated with that CID by Internet Server 102. Still other methods including combinations of those described above may be used to link the call to the Web server.

Once the incoming call, client session history and associated client information are provided to a sales representative, this information is displayed on sales representative computer terminals 112a–112c. Call control and ACD supplied information are provided to the sales representative by Terminal Software 116, while access to Internet Server 102 is provided by Web Browser 120. The sales representatives use telephones 114a–114c for voice communications with customers.

While the preceding assumes that the customer has initiated a voice telephone call, these methods of session identification are equally applicable to a data connection. Instead of the autodialer function initiating a call to ACD 106, it calls in to Product Database and Ordering System 108 and established a data link therewith. Once communications is established, the autodialer initiates a terminal program which transmits the session ID information. Either automatically or upon customer request (e.g., selection of a help menu), a sales representative is assigned and uses Terminal Software 116 to communicate with the customer and control data transmitted to the customer by Product Database and Ordering System 108.

In addition to voice and data communications using the switched network, the sales representative can provide information to the client over the Internet by commanding Internet Server 102 into a push mode of operation so as to provide an interactive client server system. That is, the server uses the HTTP so that it can react to queries exactly as today's servers react but with additional capabilities. Thus, the sales representative can interactively push new pages of information to the customer in response to the simultaneous voice or data communication with the customer established by the autodialer.

In addition to conventional Internet access, Merchant Sales Facility 100 includes a Secure Server 104 which functions like Internet Server 102 but which is accessible to customers only via the PSTN. Thus, once activated, the autodialer function establishes connectivity between the customer's Web Browser 14a–14c and Secure Server 104. The client interacts with Secure Server 104 in the same manner as Internet Server 102. To maintain session continuity, session history from Internet Server 102 is made available to Secure Server 104.

As can be appreciated by the foregoing description of a preferred embodiment of the invention, the autodialer capability when combined with the coordination of Internet Web and direct dialed switched access sessions provides enhanced, interactive sales opportunities. The push model server further augments these advantages. However, while the preferred embodiment has been illustrated in terms of a telephone ordering system, it is understood to be equally applicable to other environments such as providing individual help during Web research sessions, establishing dedicated conference bridges augmenting corresponding Web activities, etc.

Although the present invention has been described and illustrated in detail, it is clearly understood that the same is by way of illustration and example and is not to be taken by way of limitation, the spirit and scope of the present invention being limited only by the terms of the appended claims.

What is claimed is:

1. A terminal device for retrieving information from a plurality of remote information sites on a first communications network and, in response to the retrieved information, establishing communications with a remote node on a second communications network distinct from the first communications network, the terminal device comprising:

a first communications interface connected to the first communications network for receiving address data from a selected one of the remote information sites;

an output device connected to said first communications interface for providing said address data;

an input device for designating said address data; and a second communications interface connected to the second communications network and responsive to a designation of said address data by said input device for establishing communications with the remote node corresponding to said address data.

2. The terminal device of claim 1, wherein said output device comprises a display providing a visually perceptible image representing said address data.

3. The terminal device of claim 1, wherein said first communications network comprises a packet network and said second communications network comprises a switched network.

4. The terminal device of claim 1, wherein said first communications network comprises an internetwork of data networks and said first communications interface comprises a Web Browser processing hypertext markup language (HTML) messages received from the internetwork.

5. The terminal device of claim 4 wherein said second communications network comprises a switched voice network and said second communications interface comprises voice transmission and reception apparatus.

6. The terminal device of claim 5 wherein said first and second communications interfaces operate substantially simultaneously to provide communications access to ones of said remote information sites while maintaining communications with said remote node.

7. The terminal device of claim 5 further comprising session identification means for supplying information to said remote node identifying one of the HTML messages received from the internetwork.

8. The terminal device of claim 1, wherein said first communications interface comprises a first terminal application including:
 hypertext processing means for retrieving hypertext markup language (HTML) messages from the selected remote site, said HTML messages having embedded therein (a) said address data, and (b) type information corresponding to said address data;
 display processing means for displaying the HTML messages on said output device and for providing said address data in response to said input device designating said address data; and
 helper program launching means responsive to said type information for activating said second communications interface and supplying said address data thereto.

9. The terminal device of claim 8 where in said type information is encoded as a Multipurpose Internet Mail Extension (MIME).

10. The terminal device of claim 1 wherein the first communications network is a packet network and said first communications interface includes a packet network interface for communicating with the remote sites using Transmission Control Protocol/Internet Protocol (TCP/IP) network communications protocols.

11. The terminal device of claim 1 further comprising an Integrated Services Digital Network (ISDN) interface connected to and supplying connectivity between said first communications interface and the first communications network.

12. The terminal device of claim 11 wherein said ISDN interface is further connected to and provides connectivity between said second communications interface and the second communications network.

13. The terminal device of claim 12 wherein said second communications network includes an ISDN circuit having at least one D and B channel, said ISDN interface responsive to said designation of said address data for supplying routing data to said second communications network on said ISDN D channel.

14. The terminal device of claim 1 wherein the second communications network includes a switched telephone network and said second communications interfaces further includes an autodialer comprising:
 a tone generator providing dual tone multi-frequency (dtmf) signals in response to said address data; and
 an analog telephone circuit interface applying said dtmf signals from said tone generator to the switched telephone network.

15. The terminal device of claim 14, said second communications interface further comprising a modulator/demodulator (modem) connected to the second communications network for transmitting and receiving data to and from said remote node.

16. The terminal device of claim 1 further comprising a telephone instrument for providing real time duplex voice communications with the remote node over the second communications network in response to said second communications interface establishing communications with said remote node.

17. The terminal device of claim 16 wherein said telephone instrument comprises an analog POTS telephone.

18. The terminal device of claim 16 wherein said telephone instrument comprises an ISDN telephone instrument.

19. The terminal device of claim 1 further comprising a video coder/decoder (codec) for providing real time video communications with the remote node over the second communications network in response to said second communications interface establishing communications with said remote node.

20. The terminal device of claim 19 further comprising a video camera supplying a video signal to said codec.

21. The terminal device of claim 1 further comprising means for identifying to said remote node address information of said selected one of the remote information sites.

22. A terminal device for retrieving information from a plurality of remote information sites and, in response to the retrieved information, simultaneously establishing a private communications link with a remote communications node on a second communications network, the terminal device comprising:
 a first communications interface connected to a first communications network for receiving address data from a selected one of the remote information sites;
 an output device connected to said first communications interface for providing said address data;
 an input device for designating said address data; and
 a second communications interface connected to the second communications network and responsive to a designation of said address data by said input device for establishing communications with the remote node corresponding to said address data.

23. The terminal device of claim 22, wherein said output device comprises a display providing a visually perceptible image representing said address data.

24. The terminal device of claim 22, wherein said first communications network comprises an internetwork of data networks and said first communications interface comprises a Web Browser processing hypertext markup language (HTML) messages received from the internetwork.

25. The terminal device of claim 24 wherein said second communications network comprises a switched voice network and said second communications interface comprises voice transmission and reception apparatus.

26. The terminal device of claim 25 further comprising session identification means for supplying information to said remote node identifying one of the HTML messages received from the internetwork.

27. The terminal device of claim 22, wherein said first communications interface comprises a first terminal application including:
 hypertext processing means for retrieving hypertext markup language (HTML) messages from the selected remote site, said HTML messages having embedded therein (a) said address data, and (b) type information corresponding to said address data;
 display processing means for displaying the HTML messages on said output device and for providing said address data in response to said input device designating said address data; and
 helper program launching means responsive to said type information for activating said second communications interface and supplying said address data thereto.

28. The terminal device of claim 25 where in said type information is encoded as a Multipurpose Internet Mail Extension (MIME).

29. The terminal device of claim 22 wherein the first communications network is a packet network and said first communications interface includes a packet network interface for communicating with the remote sites using Transmission Control Protocol/Internet Protocol (TCP/IP) network communications protocols.

30. The terminal device of claim 22 further comprising an Integrated Services Digital Network (ISDN) interface connected to and supplying connectivity between said first communications interface and the first communications network.

31. The terminal device of claim 30 wherein said ISDN interface is further connected to and provides connectivity between said second communications interface and the second communications network.

32. The terminal device of claim 22 wherein the second communications network includes a switched telephone network and said second communications interfaces further includes an autodialer comprising:

a tone generator supplying dual tone multi-frequency (dtmf) signals in response to said address data; and an analog telephone circuit interface applying said dtmf signals from said tone generator to the switched telephone network.

33. The terminal device of claim 32 further comprising a telephone instrument for providing real time duplex voice communications with said remote node over the second communications network in response to said second communications interface establishing communications with said remote node.

34. The terminal device of claim 33 wherein said telephone instrument comprises an analog POTS telephone.

35. The terminal device of claim 32 wherein said telephone instrument comprises an ISDN telephone instrument.

36. The terminal device of claim 31, said second communications interface further comprising a modulator/demodulator (modem) connected to the second communications network for transmitting and receiving data to and from said remote node.

37. The terminal device of claim 22 further comprising means for identifying to said remote node address information of said selected one of the remote information sites.

38. A data processing system for interactively providing information to a remote client on a first communications network in response to a client request and under supervisory control by a system operator in direct communications with the client on a second communications network, the data processing system comprising:

a first communications interface connected to the first communications network for receiving address data from the client;

a server storing a plurality of pages of information and, in response to said address data, transmitting on the first communications network a selected one of said pages of information to the client;

an operator terminal connected to the second communications network and receiving incoming calls thereon, said operator terminal connected to said server and including (i) a display indicating the selected one of said pages of information transmitted to the client and (ii) server control means for supplying address data to said server to cause it to transmit another selected one of said pages of information to the client on the first communications network while said operator terminal remains connected to the client on the second communications network.

39. The data processing system of claim 38, wherein said first communications network comprises an internetwork of data networks and said pages of information comprise data formatted in hypertext markup language (HTML).

40. The data processing system of claim 38 wherein said second communications network comprises a switched voice network and said operator terminal further comprises voice transmission and reception apparatus connected to said switched voice network.

41. The data processing system of claim 40 further comprising session identification means for receiving information the client identifying the selected one of said pages of information transmitted to the client.

42. The data processing system of claim 38 wherein the first communications network is a packet network and said first communications interface includes a packet network interface for communicating with the remote sites using Transmission Control Protocol/Internet Protocol (TCP/IP) network communications protocols.

43. The data processing system of claim 38 further comprising an Integrated Services Digital Network (ISDN) interface connected to and supplying connectivity between said first communications interface and the first communications network.

44. A method of automatically establishing communications with a remote node of a switched communications network using address data contained in hypertext data obtained from a packet data network distinct from the switched communications network, comprising the steps of:

retrieving hypertext information from a remote information site on the packet data network;

displaying said hypertext information;

designating a portion of said displayed hypertext information;

identifying address data corresponding to the designated portion of the displayed hypertext information; and establishing communications with the remote node on the switched communications network corresponding to said identified address data.

45. The method according to claim 44 further comprising the step of supplying information to said remote node identifying said hypertext information.

46. The method according to claim 44 wherein said establishing communications step further comprises the steps of providing dual tone multi-frequency (DTMF) signals in response to said identified address data and applying said dtmf signals to said switched communications network.

* * * * *